US008284714B2

(12) United States Patent
Ray

(10) Patent No.: US 8,284,714 B2
(45) Date of Patent: Oct. 9, 2012

(54) SYSTEMS AND METHODS FOR TEMPORARY MEDIA FILE STORAGE ON A WIRELESS COMMUNICATION DEVICE

(75) Inventor: Rajarshi Ray, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 907 days.

(21) Appl. No.: 11/627,309

(22) Filed: Jan. 25, 2007

(65) Prior Publication Data

US 2008/0039058 A1   Feb. 14, 2008

Related U.S. Application Data

(60) Provisional application No. 60/837,181, filed on Aug. 10, 2006.

(51) Int. Cl.
*H04W 4/00* (2009.01)
(52) U.S. Cl. ........ 370/328; 370/338; 709/203; 709/217; 709/218; 709/219; 709/227; 709/246; 463/42; 705/26
(58) Field of Classification Search .................. 370/328, 370/338; 709/227, 203, 246, 217–219; 463/42; 705/26
See application file for complete search history.

(56) References Cited

U.S. PATENT DOCUMENTS

| 7,562,112 | B2 * | 7/2009 | Harrow et al. ............... 709/203 |
| 7,730,164 | B1 * | 6/2010 | Palaniappan ................. 709/219 |
| 7,921,155 | B2 * | 4/2011 | Harrow et al. ............... 709/203 |
| 2004/0172336 | A1 * | 9/2004 | Forsell et al. ................ 705/26 |

FOREIGN PATENT DOCUMENTS

| WO | 03005244 | 1/2003 |
| WO | 03052609 | 6/2003 |
| WO | 03052610 | 6/2003 |
| WO | 2006063868 | 6/2006 |

OTHER PUBLICATIONS

International Search Report—PCT/US07/075400, International Search Authority—European Patent Office—Rijswijk—Jun. 12, 2008.
International Search Report—PCT/US07/075400, International Search Authority—European Patent Office—Munich—Jun. 12, 2008.
Written Opinion—PCT/US07/075400, International Search Authority, European Patent Office, Jun. 12, 2008.
Taiwan Search Report—TW096129757—TIPO—May 10, 2011.

* cited by examiner

*Primary Examiner* — Amancio Gonzalez
(74) *Attorney, Agent, or Firm* — Abdollah Katbab

(57) ABSTRACT

Methods, devices, computer program products, processors and wireless networks are presented that provide for temporary storage of media content on a wireless communication device. According to aspects, when a wireless communication device requests media content from a media content service but is unable to receive the media due to insufficient memory availability, insufficient wireless network signal strength or another delivery attribute, the media content service automatically re-directs delivery of the content to the associated temporary storage wireless communication device. In turn, the wireless device that requested the media content is able to automatically retrieve the media content from the temporary storage device when memory capacity or network signal strength is deemed sufficient to provide for storage or reception.

71 Claims, 10 Drawing Sheets

SYSTEMS AND METHODS FOR TEMPORARY MEDIA FILE STORAGE ON A WIRELESS COMMUNICATION DEVICE

CLAIM OF PRIORITY UNDER 35 U.S.C. §119

The present Application for Patent claims priority to Provisional Application No. 60/837,181 entitled "Using A Wireless Device as a Server" filed Aug. 10, 2006, and assigned to the assignee hereof and hereby expressly incorporated by reference herein.

BACKGROUND

1. Field

The disclosed aspects relate to wireless communication devices, and more particularly, to methods and apparatus for providing temporary storage of media file on a wireless communication device for subsequent delivery to another wireless communication device through an automated or manual data delivery re-direction process.

2. Background

Wireless communication devices have become a prevalent means by which majorities of people worldwide have come to communicate. Wireless communication devices have become smaller and more powerful in order to meet consumer needs and to improve portability and convenience. The increase in processing power in wireless communication devices such as cellular telephones has lead to an increase in demands on wireless network transmission systems. As wireless communication device capabilities expand, adaptive capabilities of such wireless communication devices become possible.

Many wireless communication devices, such as cellular telephones, are currently equipped with the capability to execute, i.e., "play", media files, such as music files, video files, multimedia files and the like. These media files are typically large in terms of storage size and, thus, if stored locally at the wireless device require an appropriate amount of memory capacity. The need for increased memory capacity becomes more of a concern if the user desires to store multiple media files locally at the wireless device.

While many current high-end wireless communication devices are being marketed with increased memory capacity, upwards of 1 gigabyte (GB) to 60 GB, many lower-end wireless communication devices are not equipped with memory capacity that allows for the storage of numerous media files. These lower-end wireless communication devices still serve a need in the marketplace, especially in developing counties in which the general populous are in need of wireless communication services but are unable to afford high-end devices. Thus, a problem exists related to how to provide media content services to wireless communication devices that have limited storage capacity.

Additionally, regardless of the memory capacity of the wireless device, users of such devices have a tendency to exhaust as much memory as the device provides by acquiring and storing media files. This results in the inability of the device to download or otherwise acquire additional media files without removing some of the existing files from the device's memory. Typically, the user of the device is unaware that the memory capacity is full or close to full until they attempt to download a desired media file and an error message is presented, alerting the user that the download function is prevented from being executed due to limited storage capacity. Unless the user chooses to immediately remove one or more files from the device's memory, the user will be unable to acquire/download the desired media file.

In addition to storage related problems, the wireless downloading of media files can be problematic because of the relatively large size of the files and the inconsistencies evident in the wireless network. If the user attempting to download a media file is located at the periphery of the wireless network coverage boundaries or if the wireless network signal strength is otherwise insufficiently low, the wireless device may be unable to successfully execute the download process. This problem is heightened in low-end wireless communication devices that typically have minimal processing capabilities, minimal power and, thus, are prone to experiencing poor network signal strength problems that leads to disconnections during the prolonged download session. The complexity of the problems is even compounded further when such a device is operating on a legacy network with low data transmission rates.

Therefore, a need exists to develop systems and methods for temporary storage of media files in a wireless communication device. The desired temporary storage should be capable of temporarily storing media files that are requested by a wireless device but are unable to be wirelessly delivered to the device because of insufficient memory capacity or insufficient wireless network signal strength. In addition, the desired temporary storage system should provide for the automatic delivery of the media files from the temporary storage to the requesting wireless device when the memory capacity and/or the network signal strength is sufficient to allow the requesting wireless device to receive and store the media file. In addition, the desired temporary storage system should provide for an easily identifiable temporary storage unit such that the temporary storage unit can readily be assigned to delivery of media files requested by a wireless communication device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented infra.

Thus, methods, devices and apparatus are presented that provide for temporary storage of media files on a wireless communication device. According to aspects, wireless communication devices may be associated with one or more designated temporary storage wireless communication devices. As such, when a wireless communication device requests media content from a media content service but is unable to receive the media due to insufficient memory availability, insufficient wireless network signal strength or another delivery attribute, the media content service directs delivery of the content to the associated temporary storage wireless communication device. In turn, the wireless device that requested the media content is able to automatically retrieve the media content from the temporary storage device when memory capacity or network signal strength is deemed sufficient to provide for storage or reception. Thus, present aspects provide for low-end wireless device that typically have low power and minimal storage capacity to experience media content play on their devices even though their devices pose problems in terms of downloading media content files from the network and storing multiple media content files. The mobile nature of the temporary storage wireless communication device provides for alternate means of delivering and downloading the media content files from the temporary storage device to the requested wireless communication devices. For example, the devices may transfer the files using peer-to-peer wireless communication, Universal Serial Bus (USB) transfer, removable flash memory or the like.

According to one aspect, a method for temporary storage of a media content file on a wireless device is defined. The method includes requesting, at a first wireless communication device, wireless communication of a media content file from a media content service and directing the media content service to communicate the media content file to a second wireless communication device for temporary storage and subsequent retrieval by the first wireless communication device based on current insufficiency of at least one delivery attribute. The delivery attribute may include available memory at the first wireless communication device, wireless network signal strength or any other attribute that prevents the delivery or downloading of the media content file on the first wireless communication device. The method may also include identifying the second wireless communication in the media content request sent from the first wireless communication device to the media content service or identifying the second wireless communication device by accessing a first wireless communication device profile stored in relation to the media content service.

The method may additionally include for the automatic delivery of the temporarily stored media content file from the second wireless communication device to the first wireless communication device once the delivery attribute that prompted temporary storage is found to be sufficient. In one aspect, automatic delivery to the first wireless communication device may include monitoring, at the first wireless communication device, the available memory amount and requesting the second wireless communication device to communicate the media content file to the first wireless communication device when the available first wireless communication device memory equals or exceeds media content file size or when the network signal strength is sufficient to provide for delivery. In an alternate aspect, automatic delivery to the first wireless communication device may include requesting, continually, the second communication device to communicate the media file to the wireless communication device and receiving, at the first wireless device, the media content file from the second wireless device when the available memory amount is equal to or exceeds media content file size, when the network signal strength is sufficient to provide for downloading or when any other delivery attribute that prompted temporary storage is found to be sufficient. The first and second wireless communication devices may communicate via peer-to-peer wireless communication such that transfer of the media content file from the second device to the first device occurs via peer-to-peer communication.

A related aspect is defined by at least one processor configured to perform the actions of requesting, at a first wireless communication device, wireless communication of a media content file from a media content service and directing the media content service to communicate the media content file to a second wireless communication device for temporary storage and subsequent retrieval by the first wireless communication device based on current insufficiency of at least one delivery attribute.

Another related aspect is defined by a computer program product comprising a computer readable medium. The computer readable medium includes a first set of codes for causing a computer at a first wireless communication device to request a wireless communication of a media content file from a media content service, and a second set of codes for causing the computer to direct the media content service to communicate the media content file to a second wireless communication device for temporary storage and subsequent retrieval by the first wireless communication device based on current insufficiency of at least one delivery attribute.

A further aspect is provided for by a wireless communication device that includes a computer platform including a processor and a memory; and a media content module stored in the memory and executable by the processor. The media content module is operable to generate and wirelessly transmit a service content request to a media content service. The media content module is also operable to direct the media content service to communicate the media content file to a second wireless communication device based on current insufficiency of at least one delivery attribute and retrieve the media content file from the second wireless communication device based on subsequent sufficiency of the at least one delivery attribute. The delivery attribute may be defined as available memory capacity at the first wireless communication device, wireless network signal strength at the first wireless communication device and any other attribute that prevents delivery or download of the media content file. As such, the media content module may also be operable to determine if the available memory amount is less than the predetermined media content file size or if the wireless network signal strength meets a predetermined delivery threshold signal strength.

In some aspects, the wireless communication device may include a peer-to-peer communication module operable to retrieve the media content file from the second wireless communication device. The communication module may be operable to request the second wireless communication device to communicate the media content file to the first wireless communication device when the previous insufficient delivery attributed is determined to be sufficient. Alternatively, the communication module may request, continually, the second communication device to communicate the media file to the wireless communication device once the second wireless device has received the media content file.

In some aspects of the device, the media content request may include a second wireless device identifier that is operable to direct delivery of the predetermined media content file to a second wireless communication device corresponding to the second wireless communication device identifier based on insufficiency of at least one delivery attribute. Alternatively, the media content module may further be operable to generate and wirelessly transmit an alternate delivery destination request to the media content service that includes the second wireless communication device identifier. The media content module may further be operable to monitor the delivery attribute after the media content service has been directed to communicate the media content file to a second wireless communication device based.

A related aspect is provided for by a wireless communication device that includes a means for requesting, at a first wireless communication device, wireless communication of a media content file from a media content service and a means for directing the media content service to communicate the media content file to a second wireless communication device for temporary storage and subsequent retrieval by the first wireless communication device based on current insufficiency of at least one delivery attribute.

Yet another aspect is provided for by a method for temporary storage of a media content file. The method includes receiving, at a first wireless communication device, a media content file, delivered from a media content service, wherein receipt of the media content file by the first wireless communication device is based on an insufficient delivery attribute associated with a media content request generated by a second wireless communication device, storing the media content file at the first wireless communication device and communicating the media content file to the second wireless communication in response to a prompt from the second wireless device. The delivery attribute may include available memory amount at the second wireless communication device, wireless network signal strength at the second wireless communication device or any other attribute that prevents delivery/download of the media file at the second wireless communication device. Communicating the media content file to the second wireless device may involve communicating the media content file to the second wireless communication device, repeatedly, in response to continuous prompts from the second wireless device until the communication is successfully received at the second wireless communication device or, alternatively, communicating the media content file to the second wireless communication in response to a prompt from the second wireless device, where the prompt is based on sufficiency of one or more delivery attributes at the second wireless communication device.

A related aspect is provided for by at least one processor configured to perform the actions of receiving, at a first wireless communication device, a media content file, delivered from a media content service, such that receipt of the media content file by the first wireless communication device is based on an insufficient delivery attribute associated with a media content request generated by a second wireless communication device, storing the media content file at the first wireless communication device and communicating the media content file to the second wireless communication in response to a prompt from the second wireless device.

A further related aspect is defined by a computer program product comprising a computer readable medium. The computer readable medium includes a first set of codes for causing a computer at a first wireless communication device to receive a media content file, delivered from a media content service, such that receipt of the media content file by the first wireless communication device is based on an insufficient delivery attribute associated with a media content request generated by a second wireless communication device. The computer readable medium further includes a second set of codes for causing the computer to store the media content file at the first wireless communication device, and a third set of codes for causing the computer to communicate the media content file to the second wireless communication in response to a prompt from the second wireless device.

Another aspect is provided for by a wireless communication device that includes a computer platform including a processor and a memory. The memory is operable to store a media content file, which has been delivered from a media content service based on an insufficient delivery attribute associated with a media content request generated by a second wireless communication device. The wireless communication device also includes a communications module executable by the processor and operable to communicate the media file to the secondary wireless communication device in response to a prompt from the second wireless device. The delivery attribute being defined as available memory amount at the second wireless communication device, wireless network signal strength at the second wireless communication device or any other attribute that prevents delivery/download of the media content file at the second wireless communication device. The communications module may further be operable to communicate the media content file to the second wireless communication device, repeatedly, in response to continuous prompts from the second wireless device until the communication is successfully received at the second wireless communication device or, alternatively, operable to communicate the media content file to the second wireless communication in response to a prompt from the second wireless device, wherein the prompt is based on sufficiency of one or more delivery attributes at the second wireless communication device.

Another related aspect is defined by a wireless communication device that includes means for receiving, at a first wireless communication device, a media content file, delivered from a media content service, such that receipt of the media content file by the first wireless communication device is based on an insufficient delivery attribute associated with media content request generated by a second wireless communication device, means for storing the media content file at the first wireless communication device and means for communicating the media content file to the second wireless communication in response to a prompt from the second wireless device.

A further aspect is defined by a method for temporary media content storage. The method includes receiving a media service request for media content file from a first wireless communication device, determining that the first wireless communication device is unable to currently receive delivery due to an insufficient delivery attribute, identifying a second wireless communication device as a temporary storage device for the first wireless communication device and communicating the media content file to the second wireless communication device. The delivery attribute may be available memory amount at the first wireless communication device, wireless network signal strength at the first wireless communication device or any other attribute that prevents delivery/download at the first wireless communication device. The method may further include acknowledging receipt of one or more error message received from the first wireless communication device in response to sending the media content file to the first wireless communication device.

A related aspect is provided for by at least one processor configured to perform the actions receiving a media service request for media content file from a first wireless communication device, determining that the first wireless communication device is unable to currently receive delivery due to an insufficient delivery attribute; identifying a second wireless communication device as a temporary storage device for the first wireless communication device and communicating the media content file to the second wireless communication device.

An alternate aspect is provided for by a computer program product comprising a computer readable medium. The computer readable medium includes a first set of codes for causing a computer to receive a media service request for media content file from a first wireless communication device. The computer readable medium further includes a second set of codes for causing the computer to determine that the first wireless communication device is unable to currently receive delivery due to an insufficient delivery attribute. Additionally, the computer readable medium further includes a third set of codes for causing the computer to identify a second wireless communication device as a temporary storage device for the first wireless communication device, and a fourth set of codes for causing the computer to communicate the media content file to the second wireless communication device.

Yet another aspect is defined by a network device that includes a computer platform including a processor and a memory and a media content delivery service module stored in the memory and executable by the processor. The media content delivery module is operable to receive a media service request for a media content file from a first wireless communication device, determine that the first wireless communication device is unable to currently receive delivery due to an insufficient delivery attribute, identify a second wireless communication device as a temporary storage device for the first wireless communication device and communicate the media content file to the second wireless communication device. The delivery attribute may include available memory amount at the first wireless communication device, wireless network signal strength at the first wireless communication device or any other attribute that prevents delivery/download at the first wireless communication device. The media content delivery service module may further be operable to acknowledge receipt of one or more error messages received from the first wireless communication device in response to sending the media content file to the first wireless communication device.

A related aspect is provided for by a network device that includes means for receiving a media service request for media content file from a first wireless communication device, means for determining that the first wireless communication device is unable to currently receive delivery due to an insufficient delivery attribute, means for identifying a second wireless communication device as a temporary storage device for the first wireless communication device, and means for communicating the media content file to the second wireless communication device.

Thus, present aspects provide for methods, devices, computer program products and processors that provide for temporary storage of media content on a wireless communication device. As such, when a wireless communication device requests media content from a media content service but is unable to receive the media due to insufficient memory availability, insufficient wireless network signal strength or another delivery attribute, the media content service directs delivery of the content to the associated temporary storage wireless communication device. In turn, the wireless device that requested the media content is able to automatically retrieve the media content from the temporary storage device when memory capacity or network signal strength is deemed sufficient to provide for storage or reception.

DETAILED DESCRIPTION

Figure 1:
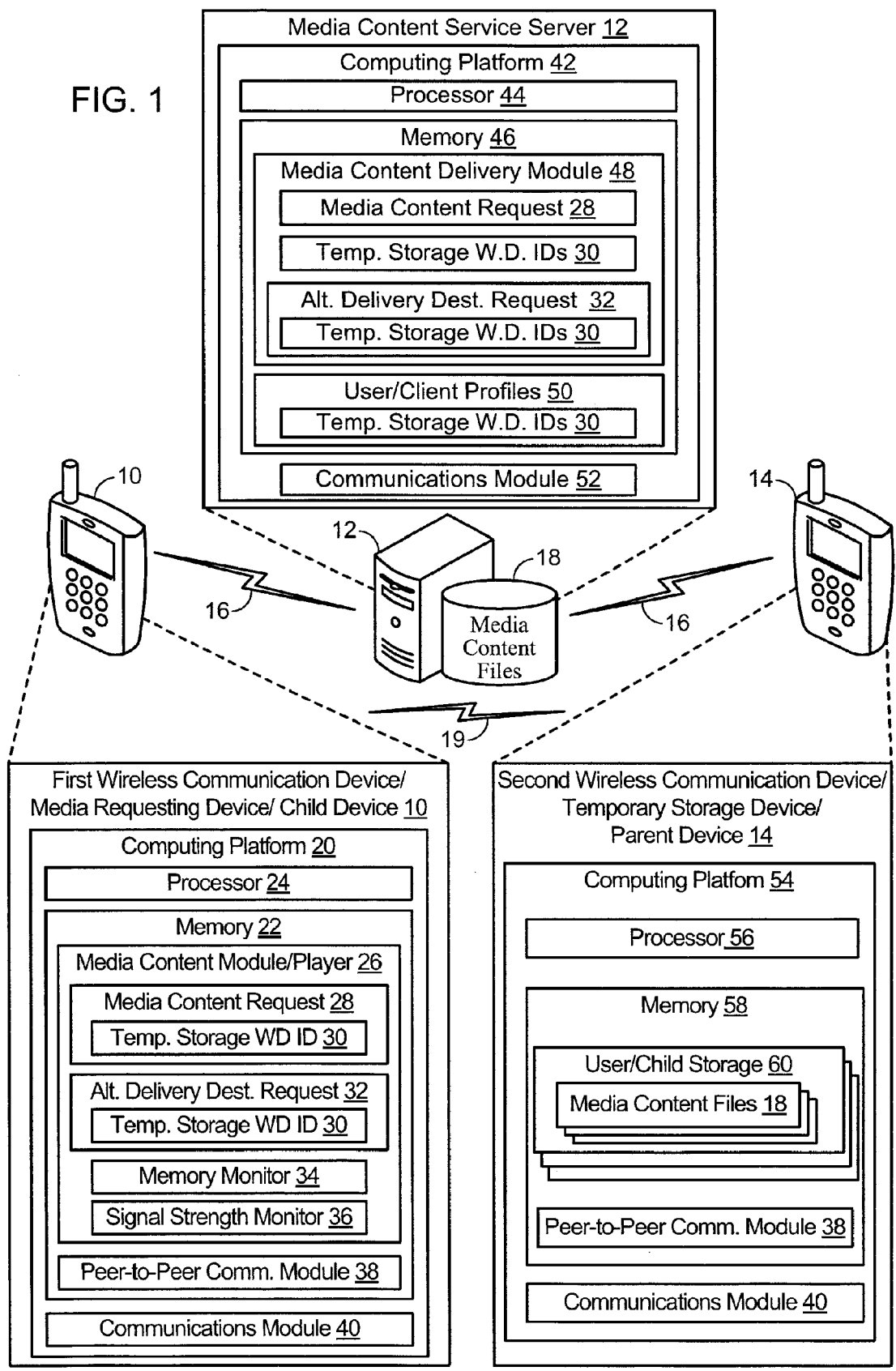
FIG. 1 is a block diagram representation of a system for temporary storage of media files on a wireless communication device, according to one aspect.

The present devices, apparatus, methods, computer program products and processors now will be described more fully hereinafter with reference to the accompanying drawings, in which aspects of the invention are shown. These aspects may, however, be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout.

The various aspects are described herein in connection with a wireless communication device. A wireless communication device can also be called a subscriber station, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Present aspects provide for temporary storage of media content files at a wireless device and the subsequent delivery of the files to a wireless device that requested or otherwise desires access to the files. As such, the temporary storage wireless communication devices acts a server for the wireless devices that rely on the device for storage. The mobile nature of the temporary storage wireless communication device provides needed benefits to wireless communication devices in general especially, low-end wireless communication devices.

Low-end cellular telephones may have the capability to execute, i.e., "play"; media content files, such as music files or video files, but are limited in terms of processing power and storage capacity. In these exemplary devices, minimal storage capacity typically prevents the device from storing a large amount of media content files, which are typically large in terms of storage size. Additionally, the low-power nature of these devices results in prolonged delivery/download times, which, due to the size of the media content files and the unreliability of the wireless network, often result in unsuccessful delivery/download of media content files.

Conventional wireless network servers used in the industry today are stationary web-servers that are located at a fixed location and serve a number of mobile devices through one of more stationary cell-towers. As a result, a community of users located at the fringe of the network may receive very poor signals, especially those with low-end/low-power devices, and as a result, they may not be able to maintain communication with the central server over a long period of time to download full-length movies, songs or other large multimedia files. In present aspects, the mobile nature of the temporary storage wireless communication device provides these low-end devices an alternate means for delivery/downloading the files.

According to one aspect, requested media files are delivered/downloaded to the temporary storage wireless communication device, as opposed to the device that requested the files. In many instances, the temporary storage wireless device may be a higher-end device characterized by greater processing power and larger memory capacity. Thus in many applications, the mobile wireless device may be better equipped to download the media content or receive stronger signals if the temporary storage wireless device is closer in proximity to the delivering cell-tower(s). Additionally, the larger storage capacity that is typically provided for by higher-end wireless communication devices allows for the storage of many more media content files than would be afforded the low-end/small memory devices.

In application, once the temporary storage wireless device has obtained the media files delivery to the device that originally requested the content can occur either when the requesting device has cleared enough memory space to accommodate the file or when the wireless signal between the requesting device and the temporary storage wireless device is strong enough to accommodate delivery/download. In some aspects, the requesting devices and the temporary storage devices may be equipped with peer-to-peer wireless communication capabilities, which allow for direct wireless device-to-wireless device communication of the media files.

In many instances, the wireless devices that are requiring the temporary storage wireless devices to store information are associated with the device. For example, one member of a family, workplace, organization or the like may utilize the temporary storage wireless device while other members of the family, workplace, organization may utilize the devices that rely on the temporary storage wireless device for temporary storage. This example takes into account that in most instances awareness and authorization on the part of the temporary storage wireless device will be required prior to having other devices rely of the temporary storage wireless device for temporary storage purposes. This association between the wireless devices requiring temporary storage and the wireless device providing the temporary storage, typically means that the devices will, at some point in time, be close in proximity to one another, which further addresses shortcomings in signal strength and provides further for ease in delivery/download between the temporary storage wireless device and the device requiring temporary storage.

Referring to FIG. 1, a schematic representation of a system for temporary storage of media content at a wireless device is depicted. The system includes one or more first wireless communication devices 10, also referred to herein as the requesting devices or child devices, a network device 12, such as a media content service server, and a second wireless communication device 14, also referred to herein as the temporary storage device or the parent device. The second wireless communication device 14 is an illustration of a wireless device acting as a mobile server that temporarily stores media content for a community of first wireless devices 10, in accordance with an aspect. As such, the second wireless communication devices 16 act as mobile servers that temporarily store media content files requested by the first wireless communication device.

The first wireless communication devices 10 are in wireless communication, via wireless network 16, with network device 14. Network device 14 is characteristically a media content service server that has access to a plurality of media content files 18, which may be stored locally at network device 14 or remotely at one or more network databases that in wired or wireless communication with the network device. Network device 14 is operable to receive media content file requests, such as requests for audio/music files, video files and/or multimedia files, from the one or more wireless devices 10.

The network device 14 is in wireless communication, via wireless network, 16, with second wireless communication device 16. Network device 16 is operable to direct the delivery of media content files, which have been requested by wireless communication devices 10, to second communication device 16 for temporary storage of the media content file. Typically, direction of the delivery of the media content files to the second wireless communication device is precipitated by the existence of an insufficient delivery attribute at the first wireless communication device. Examples, of delivery attributes may include available memory capacity, wireless network signal strength or any other attribute that affects delivery/download at the first wireless device.

The second wireless communication device 16 may be in wireless communication, via peer-to-peer wireless network 20, with the one or more first wireless communication devices. First wireless communication devices 10 may be operable to automatically retrieve the temporarily stored media content files from the second wireless communication device when the network attribute that originally prevented delivery to the first wireless communication device is determined to be sufficient to allow for delivery/download.

The first wireless communication device 10, also referred to herein as the media requesting device or the child device, includes a computing platform 20 having a memory 22 and a processor 22. The memory 22 includes a media content module/player 26 that is operable for generating media content requests 28 at the direction of the device user. The media content requests are wirelessly communicated to network device 12 via communication module 40. In some aspects the media content requests may include a temporary storage wireless communication device identifier 30, which provides notification to the network device of a specific temporary storage wireless device, such as device 16, to direct delivery/download of the media content file. For example, the media content requests may be communicated via an uplink connection through http (hyper text transfer protocol) to network device 12 and the request may include a header file that includes the temporary storage identifier 30, in the form of an Internet Protocol (IP) address of the wireless device that will serve as the temporary storage device. In alternate aspects, the media content module/player 26 may be operable to generate and communicate alternate delivery destination requests 32 that include a temporary storage wireless communication device identifier 30. The alternate delivery destination request 32 may be communicated to the network device 12 prior to requesting media content, in which case the temporary storage identifier may be stored at the network device for subsequent use. Additionally, the alternate delivery destination request 32 may be communicated to the network device 12 after requesting media content and after the network device has been unable to deliver/download the media file content to the first wireless communication device 10.

The first wireless device 10 may additionally include monitors, such as memory monitor 34 and signal strength monitor 36, that monitor delivery attributes associated with the first wireless communication device. Delivery attributes are defined herein as characteristics that affect the delivery/download of content. As such, the delivery attributes may include available memory, wireless network signal strength and the like. The monitors may determine if the first wireless communication device is capable of delivery/download of the requested media content. For example, the memory monitor 34 may determine the current available memory capacity of the first wireless communication device and compare the available memory to the requested media file storage size. If sufficient memory currently exists at the first wireless device prior to requesting delivery of a media content file, the first wireless device may notify the network device that direct delivery to the first wireless device is possible. If, however, insufficient memory currently exists at the first wireless communication device the device may notify the network device 12 that delivery of the file to the temporary storage device is required. In another example, the signal strength monitor 36 may determine the current wireless network signal strength, typically in terms of received signal strength power (RSCP), and compare the signal strength to delivery signal strength threshold. If sufficient signal strength currently exists at the first wireless device prior to requesting delivery of a media content file, the first wireless device may notify the network device that direct delivery to the first wireless device is possible. If, however, insufficient signal strength currently exists at the first wireless communication device the device may notify the network device 12 that delivery of the file to the temporary storage device is required. The memory monitor 34 and the signal strength monitor 36 may also be implemented after the media content file has been communicated to the temporary storage device to determine if the first wireless communication device can accept delivery/download of the media content file from the temporary storage device.

The first wireless communication device may additionally include a peer-to-peer communication module 38. The peer-to-peer communication module provides for direct communication with other wireless communication devices across peer-to-peer network 19. In present aspects, the peer-to-peer communication module provides for direct communication with the temporary storage wireless communication device 14 and may provide for the communication mechanism in transferring the media file from the temporary storage device 14 to the first wireless communication device 10.

The network device 12, also referred to herein as the media content server, includes a platform 42 having a memory 46 and a processor 44. The memory 46 includes a media content delivery module 48 that is operable for receiving media content requests 28 from first wireless communication devices 10 and delivering media content files 18 in response to the requests via communications module 52. The media content files may be stored locally in memory 18 or they may be stored in a remote database that is in network communication with network device 12. The media content delivery module may direct delivery of requested media content files 18 to temporary storage device 14 based on temporary storage device identifiers, which may be included within received media content requests 28, received alternate delivery destination requests 32 or stored within a user profile database 50.

In alternate aspects, the media content delivery module 48 may determine that delivery of a requested media file 18 be directed to the temporary storage device 14 or the media content delivery module 48 may be instructed to deliver a requested media content file to the temporary storage device 14. For example, in one aspect, the media content delivery module may attempt to deliver the media content file to the first wireless communication device and, in response to delivery, the network device may receive error messages notifying the device that delivery was unsuccessful. Unsuccessful delivery may be attributed to insufficient availability of memory at the first wireless communication device, insufficient wireless network signal strength or insufficiency of any other delivery attribute that affects the ability of the device to properly receive/download the media file. Receipt by the network device of one or more error messages may trigger the media content delivery module to direct delivery to the temporary storage device that is identified either in the media content request 28, in the alternate delivery destination request 32 or in the user profile database 50.

The second wireless communication device 14, also referred to herein as the temporary storage device or the parent device, includes a computing platform 54 having a memory 58 and a processor 56. The memory 58 includes user/child storage 50 that may store at any given moment in time one or more media files 18 for the associated first wireless communication device 10. Media files 18 are received wirelessly from network device 12 via communications module 40 and are stored locally at the second wireless communication device for the benefit of the first wireless communication device 10. The second wireless communication device 14 may additionally include a peer-to-peer communication module 38. The peer-to-peer communication module 38 provides for direct communication with first wireless communication devices and, as such, may provide for the communication mechanism in transferring the media file from the temporary storage device 14 to the first wireless communication device 10 across peer-to-peer wireless network 19. It should be noted that once the second wireless device has properly communicated the media file(s) to the first wireless communication device, the second communication device may be configured to remove the media items from memory or the device may be configured to retain the media items in memory to act as secondary or back-up storage for the first wireless communication devices.

Figure 2:
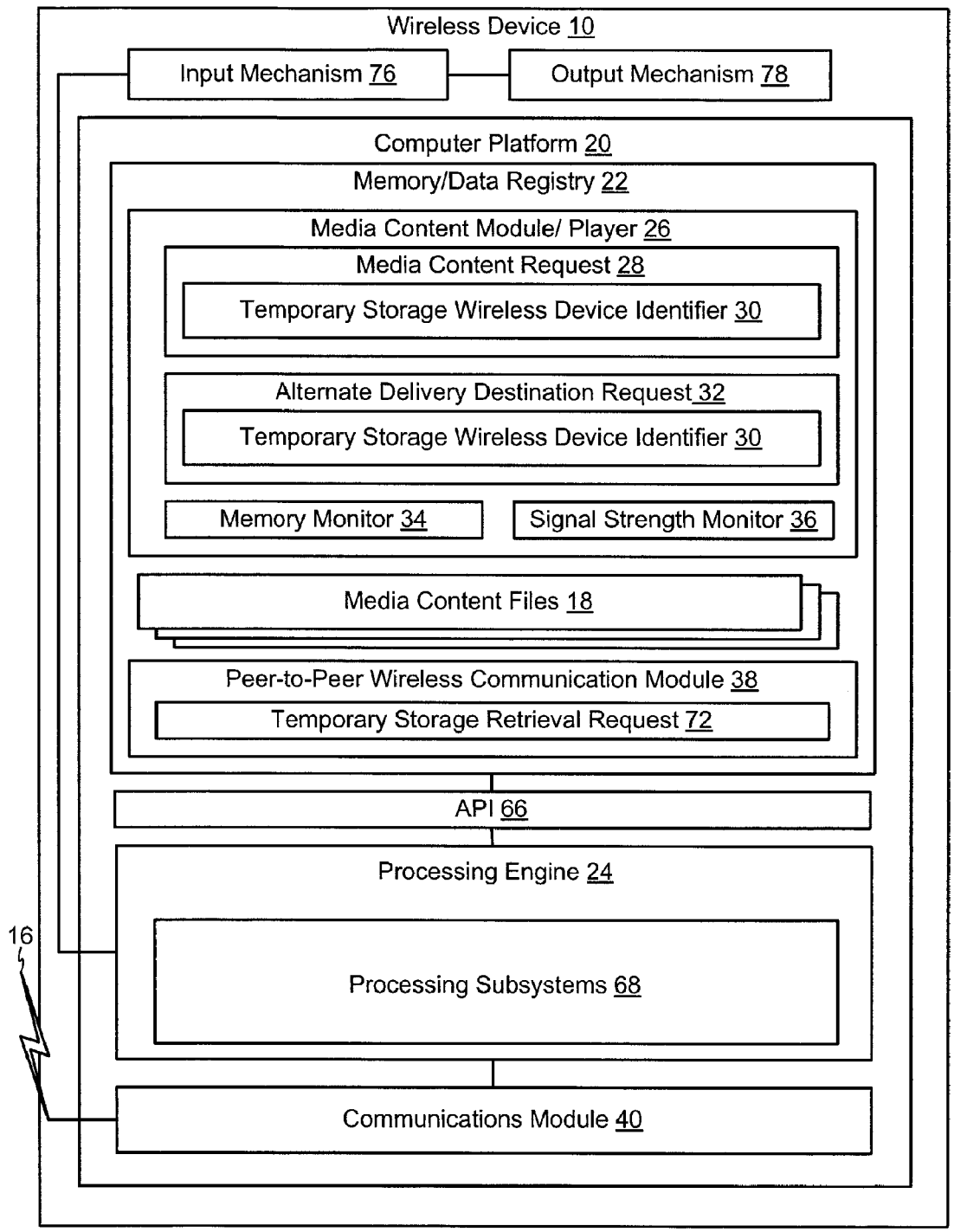
FIG. 2 is a block diagram of a wireless communication device operable for temporarily storing media content at the bequest of another wireless communication device, according to one aspect.

Referring to FIG. 2, according to one aspect, a block diagram representation of a wireless communication device 10 operable for requesting media content files and directing temporary storage of the requested files at an associated wireless device is depicted. The wireless communication device 10 may include any type of computerized, communication device, such as cellular telephone, Personal Digital Assistant (PDA), two-way text pager, portable computer, and even a separate computer platform that has a wireless communications portal, and which also may have a wired connection to a network or the Internet. The wireless communication device can be a remote-slave, or other device that does not have an end-user thereof but simply communicates data across the wireless network, such as remote sensors, diagnostic tools, data relays, and the like. The present apparatus and methods can accordingly be performed on any form of wireless communication device or wireless computer module, including a wireless communication portal, including without limitation, wireless modems, PCMCIA cards, access terminals, desktop computers or any combination or sub-combination thereof.

The wireless communication device 10 includes computer platform 20 that can transmit data across a wireless network, and that can receive and execute routines and applications. Computer platform 20 includes memory/data registry 22, which may comprise volatile and nonvolatile memory such as read-only and/or random-access memory (RAM and ROM), EPROM, EEPROM, flash cards, or any memory common to computer platforms. Further, memory/data registry 22 may include one or more flash memory cells, or may be any secondary or tertiary storage device, such as magnetic media, optical media, tape, or soft or hard disk.

Further, computer platform 20 also includes a processing engine 24, which may be an application-specific integrated circuit ("ASIC"), or other chipset, processor, logic circuit, or other data processing device. Processing engine 24 or other processor such as ASIC may execute an application programming interface ("API") layer 66 that interfaces with any resident programs, such as media content module/player 26, stored in the data registry 22 of the wireless device 10. API 66 is typically a runtime environment executing on the respective wireless device. One such runtime environment is Binary Runtime Environment for Wireless® (BREW@) software developed by Qualcomm, Inc., of San Diego, Calif. Other runtime environments may be utilized that, for example, operate to control the execution of applications on wireless computing devices.

Processing engine 24 includes various processing subsystems 68 embodied in hardware, firmware, software, and combinations thereof, that enable the functionality of communication device 10 and the operability of the communication device on a wireless network. For example, processing subsystems 68 allow for initiating and maintaining communications, and exchanging data, with other networked devices. In aspects in which the communication device is defined as a cellular telephone the communications processing engine 24 may additionally include one or a combination of processing subsystems 68, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not individually depicted in FIG. 2 for the sake of clarity). For the disclosed aspects, processing subsystems 68 of processing engine 24 may include any subsystem components that interact with the media player content module 26 and/or the peer-to-peer communication module 38 on computer platform 12.

The data registry 22 of computer platform 20 includes media content module/player 26 that is operable to generate and communicate media content file requests 28 at the bequest of the device user. The media content requests will include information that identifies one or more media files, such as a song file, a video file, multimedia file or the like, which the uses wishes to download, store and play on the first wireless communication device 10. According to present aspects, delivery attributes associated with the first wireless device may dictate that the delivery of the requested media files be re-directed to a temporary storage site, such as a temporary storage wireless communication device. The delivery attributes may include, but are not limited to, available memory capacity, wireless network signal strength and any other attribute that affects the delivery/download of media content on wireless device 10. In one aspect, the media content request 28 may include a temporary storage wireless device identifier 30, such as an IP address of a temporary storage wireless device. The temporary storage wireless device identifier serves to identify for the media content service an alternate delivery destination for the media content if delivery of the media content to the first wireless communication device is determined to be unavailable. The media content module/player 26 may be configured to automatically include one or more temporary storage device identifiers to all media file requests. In such aspects, the temporary storage device(s) will be predefined by the user of the first wireless device. Alternatively, the media content module/player 26 may be configured to include the identifier in the media content request based on the results of monitoring one or more delivery attributes, such as available memory or wireless network signal strength or the media content module/player 26 may be configured to include the identifier based on device user discretion.

Alternatively, in other aspects, the media content module/player 26 may be operable for generating and, communicating to the media content service, an alternate delivery destination request 32 that may include the temporary storage wireless device identifier 30. The alternate delivery destination request 32 may be communicated to the media content service prior to generating and communicating a media content request 28. In this aspect, the temporary storage wireless device identifier is stored in a user profile at the media content service site and is subsequently used to identify a temporary storage device if subsequent media content requests warrant re-direction of delivery due to an insufficient delivery attribute. Alternatively, the alternate delivery destination request 32 may be communicated to the media content service after generating and communicating a media content request 28. In this aspect, the media content request may not include the temporary storage identifier and the inability of the media content service to properly deliver the media content to the first wireless device due to an insufficient delivery attribute may prompt the wireless device to generate and communicate an alternative delivery destination request 32. The identifier(s) 30 that is included in the alternate delivery destination request 32 may be one or more predetermined identifiers associated with one or more predetermined temporary storage device or the identifiers may be manually added to request 32 to ad hoc temporary storage device identification.

The media content module/player 26 may additionally include one or more delivery attribute monitors, such as memory monitor 34 and signal strength monitor 36. In certain aspects, the media content module 26 may be configured to access the memory monitor 34 and/or signal strength monitor 36 prior to generating and communicating a media content request 28. In such aspects, the media content request 28 may additionally include information pertaining to delivery attributes, such as current available capacity or current wireless network signal strength. In turn, the media content service that receives the media content file request may use the delivery attribute information to determinate if delivery should be directed to the first wireless communication device (i.e., based on sufficient available memory and/or sufficient signal strength power at the first device) or if the media file delivery should be redirected to the designated temporary storage wireless device (i.e., based on insufficient available memory and/or signal strength at the first device). Additionally, in alternate aspects the monitors may be invoked after the media file request 28 has been generated and communicated to the media content service. In such aspects, the media content service may generate and send one or more queries to the wireless device 10 to establish the current state of memory availability and/or signal strength. The establishment of the delivery attributes states may be used by the media content service to determine if delivery should be directed to the first wireless device or to the temporary storage wireless device.

In further aspects, the delivery attribute monitors, such as memory monitor 34 and signal strength monitor 36 may be implemented after the requested media file has been temporarily stored at another wireless device. In one aspect, the media content module 26 may continually monitor the delivery attributes to determine when the delivery attributes are sufficient to allow for delivery/download of the media content file from the temporary storage wireless device. For example, the memory monitor 34 of media content module 26 may continually monitor memory availability to determine when the device has sufficient available memory to accommodate the storage of the media file(s) currently being stored at the temporary storage wireless device. When sufficient memory is available, based on a comparison of available memory to the storage size of the requested media files, the media content module 26 may prompt the temporary storage wireless device to deliver/download the content file(s). In another example, the signal monitor 36 of media content module 26 may continually monitor signal strength to determine when the device has sufficient signal strength to accommodate the downloading of the media file(s) from the temporary storage wireless device. When sufficient signal strength is available, based on a comparison of current signal strength to a predetermined delivery signal strength threshold, the media content module 26 may prompt the temporary storage wireless device to deliver/download the content file(s). In an alternate aspect, the temporary storage wireless device may periodically, at predefined intervals, generate and communicate one or more queries to assess the current state of delivery attributes at the first wireless device 10. The queries will invoke the delivery attribute monitors, such as memory monitor 34 and/or signal strength monitor 36 to determine current available memory and/or current signal strength for the purpose of subsequently determining at the temporary storage wireless device whether delivery/download to the first wireless device can successfully be accomplished.

The memory 22 of first wireless communication device 10 may also include a peer-to-peer wireless communication module 38 that is operable to provide direct communication between the first wireless communication device and the temporary storage wireless communication device. In one aspect, the media file that is temporarily stored may be communicated from the temporary storage wireless device to wireless device 10 by peer-to-peer communication. In other aspects, the peer-to-peer communication module may generate and communicate a temporary storage retrieval request 72 that may either continually generated and sent to request the deliver/download of the temporarily stored media file regardless of assessment of delivery attributes or the request 72 may be generated and sent upon determination that the delivery attributes, such as available memory and signal strength, are sufficient to warrant deliver/download.

Computer platform 12 may further include communications module 40 embodied in hardware, firmware, software, and combinations thereof, that enables communications among the various components of the communication device 10, as well as between the communication device 10 and the wireless network 16. In described aspects, the communication module enables the communication of all correspondence between the first wireless communication device 10 and the network device 12. The communication module 74 may include the requisite hardware, firmware, software and/or combinations thereof for establishing a wireless or wired network communication connection.

Additionally, communication device 10 has input mechanism 76 for generating inputs into communication device, and output mechanism 78 for generating information for consumption by the user of the communication device. For example, input mechanism 76 may include a mechanism such as a key or keyboard, a mouse, a touch-screen display, a microphone, etc. In certain aspects, the input mechanisms 76 provides for user input to activate an application on the communication device. Further, for example, output mechanism 78 may include a display, an audio speaker, a haptic feedback mechanism, etc.

Figure 3:
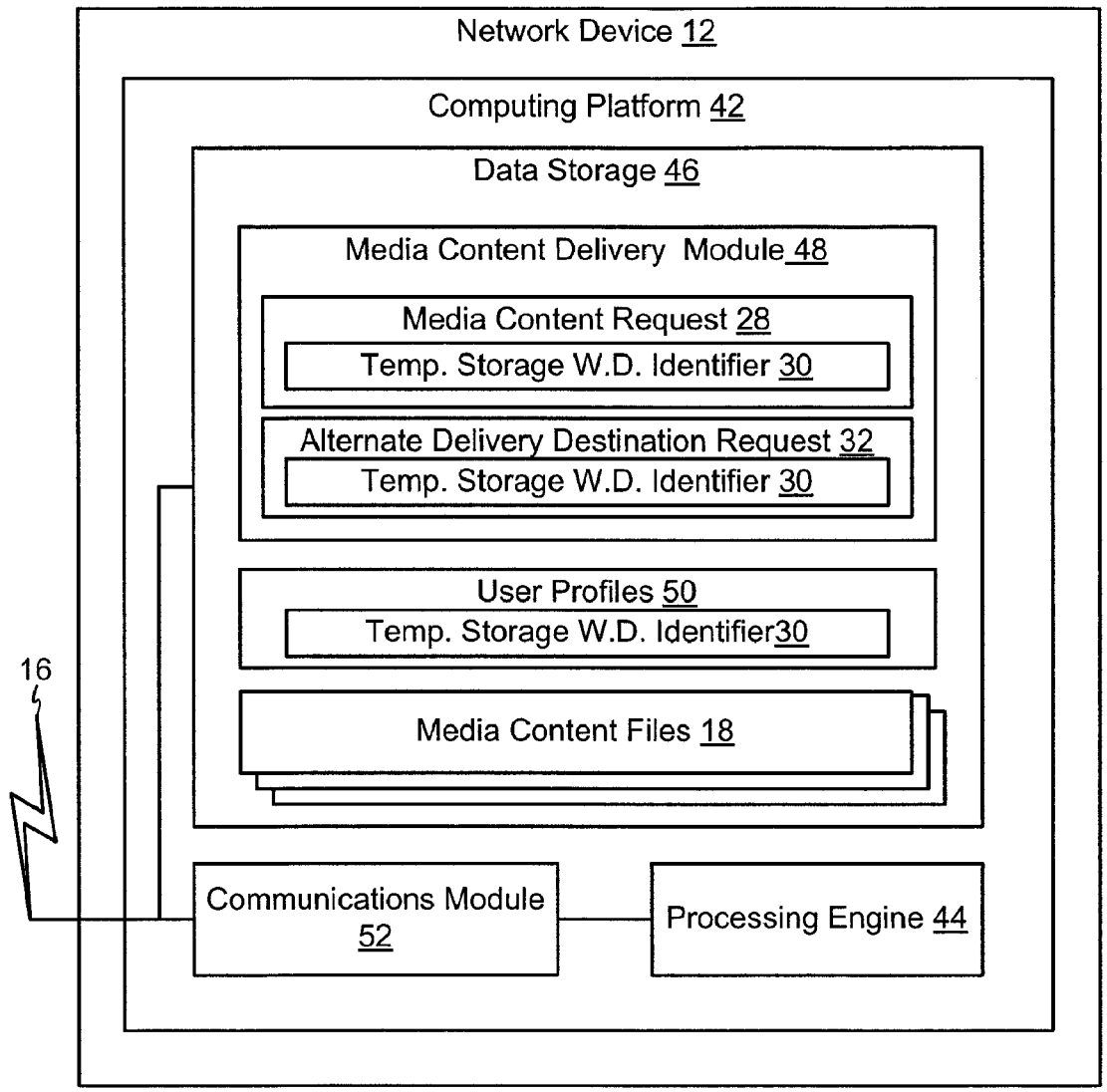
FIG. 3 is a block diagram of a wireless communication device operable for requesting delivery of media content and directing delivery of the media content to a temporary storage wireless communication device, according to one aspect.

Referring to FIG. 3, according to another aspect, a block diagram is illustrated of a network device 12, such as media content server operable to receive media content file requests and respond to the requests by delivering/downloading the content files to a temporary storage wireless device. The network device may comprise at least one of any type of hardware, server, personal computer, mini computer, mainframe computer, or any computing device either special purpose or general computing device. Further, the modules and applications described herein as being operated on or executed by the network device 12 may be executed entirely on the network device 12 or alternatively, in other aspects, separate servers or computer devices may work in concert to provide data in usable formats to parties, and/or to provide a separate layer of control in the data flow between the wireless device 10 and wireless device 14 and the modules and applications executed by network device 12.

The network device 12 has computer platform 42 that can transmit and receive data across wireless network 16, and that can execute routines and applications. Computer platform 42 includes a data storage 46, which may comprise volatile and nonvolatile memory such as read-only and/or random-access memory (RAM and ROM), EPROM, EEPROM, flash cards, or any memory common to computer platforms. Further, data storage 46 may include one or more flash memory cells, or may be any secondary or tertiary storage device, such as magnetic media, optical media, tape, or soft or hard disk. Further, computer platform 42 also includes a processing engine 44, which may be an application-specific integrated circuit ("ASIC"), or other chipset, processor, logic circuit, or other data processing device. The computer platform 42 may further include a communications module 52 embodied in hardware, firmware, software, and combinations thereof, that enables communications among the various components of the network device 12, as well as between the network device 12 and wireless network 10 and wireless device 14. The communication module may include the requisite hardware, firmware, software and/or combinations thereof for establishing a wireless communication connection.

The data storage 46 of the network device 12 may include a plurality of media content files 18, such as song files, video file, multimedia files and the like that are requested by and delivered to wireless devices. While the media files 18 are depicted as stored locally at network device 12, in many aspects the volume of the media files may dictate that the media files be stored at a remote database that is in network communication with the network device 12, such that the network device may readily retrieve a requested file from remote storage for subsequent delivery to a wireless device.

The data storage 46 of the network device 12 may additionally include a media content delivery module 48 operable for receiving media content requests 28 from wireless device 10 and directing the delivery of the requested media content files to a temporary storage wireless device based on the insufficiency of one or more delivery attributes at the requesting wireless device. In one aspect, the media content delivery module 48 will attempt to deliver the requested media files to wireless device 10. Insufficiency of one or more delivery attributes will prompt the communication of error messages back to network device 12 informing the media content delivery module 48 that delivery of the media content files was unsuccessful. The media content delivery module may be configured to respond to the unsuccessful delivery by directing the delivery/download of the files to a designated temporary storage wireless device 14. The media content delivery module 28 may obtain the temporary storage wireless device identifier 30, such as the IP address associated with the temporary storage device, from the media content request 28, an alternate delivery destination request 32 or the a client/user profile database 50.

In certain aspects, the media content delivery module 48 may further be operable to determine if re-direction of media content file delivery to a temporary storage device 14 is warranted. In certain aspects, wireless device 10 may communicate delivery attribute information, such as current available memory or current wireless network signal strength, to the media content delivery module. This information may be configured to be communicated either automatically or based on network device 12 querying of the wireless device 10. As such the delivery attribute information may be included in the media content request 28, the alternate delivery destination request 32 or in other correspondence from the wireless device 10. Once the media delivery module receives the delivery attribute information, the module may determine if re-direction is warranted based on a comparison of the attribute information-to-information related to the media file or to the network. For example, the media content delivery module 48 may compare the storage size of the media content files to the available memory at the wireless device 10 to determine if sufficient memory is available at the wireless device for delivery/download. In another example, the media content delivery module 48 may compare the current signal strength at the wireless device 10 to a predetermined delivery signal strength threshold to determine if sufficient signal strength is available at the wireless device. In alternate aspect, the determination process may be conducted at the wireless device.

Figure 4:
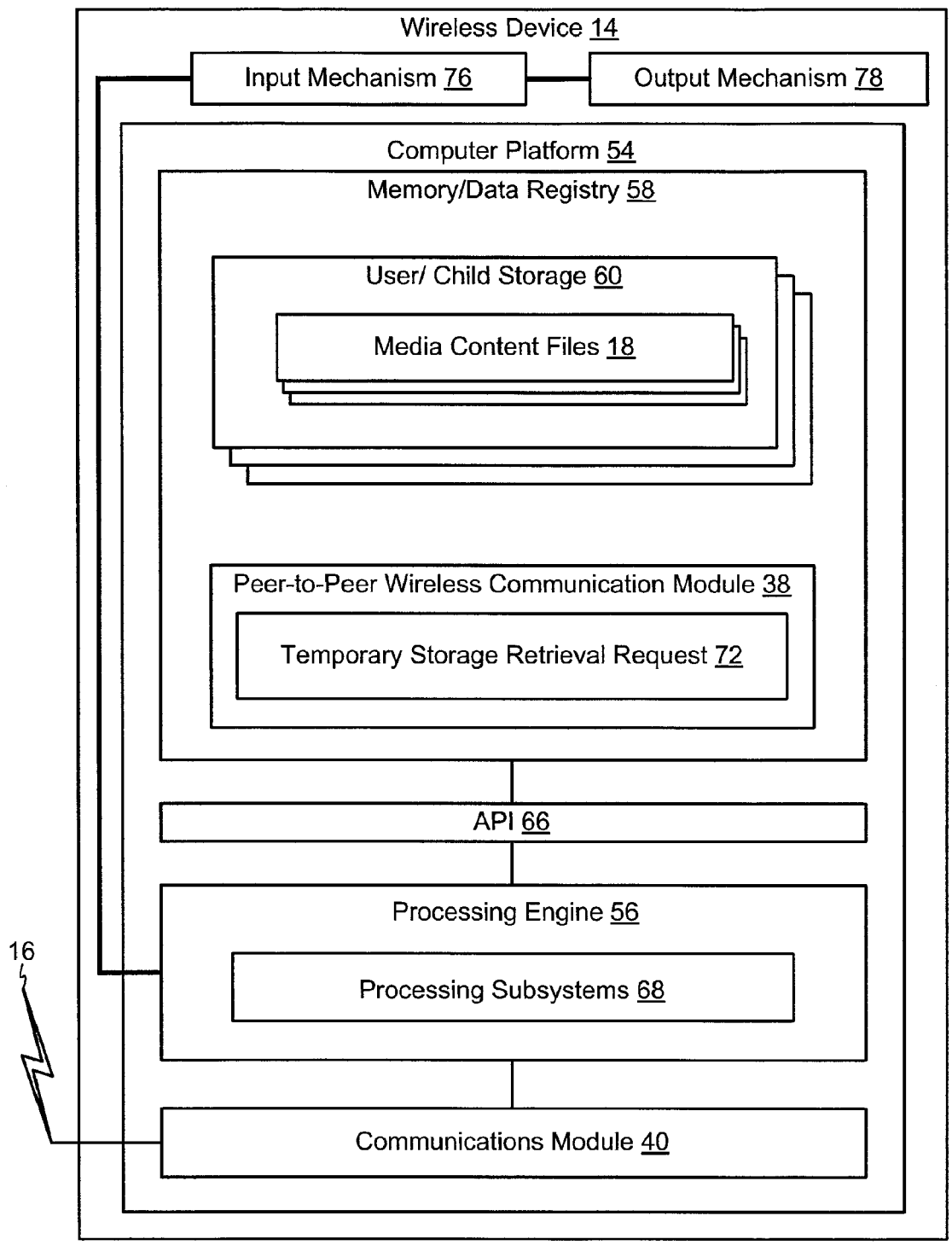
FIG. 4 is a block diagram of a network device operable for receiving media content file requests and directing delivery of the requested file to a temporary storage wireless communication device, according to one aspect.

Referring now to FIG. 4, according to one aspect, a block diagram representation of a second wireless communication device 14, otherwise referred to as the temporary storage device or the parent device, is depicted. The wireless device 14 is operable for storing media files on behalf of another wireless device and delivering/downloading the media files to the wireless device when the delivery attribute that prohibited initial delivery/download to the other wireless device is determined to be sufficient is depicted. Similar to the first wireless communication device 10, the second wireless communication device 14 may include any type of computerized, communication device, such as cellular telephone, Personal Digital Assistant (PDA), two-way text pager, portable computer, and even a separate computer platform that has a wireless communications portal, and which also may have a wired connection to a network or the Internet. The wireless communication device can be a remote-slave, or other device that does not have an end-user thereof but simply communicates data across the wireless network, such as remote sensors, diagnostic tools, data relays, and the like. The present apparatus and methods can accordingly be performed on any form of wireless communication device or wireless computer module, including a wireless communication portal, including without limitation, wireless modems, PCMCIA cards, access terminals, desktop computers or any combination or sub-combination thereof.

The wireless communication device 14 includes computer platform 54 that can transmit data across a wireless network, and that can receive and execute routines and applications. Computer platform 54 includes memory/data registry 58, which may comprise volatile and nonvolatile memory such as read-only and/or random-access memory (RAM and ROM), EPROM, EEPROM, flash cards, or any memory common to computer platforms. Further, memory/data registry 58 may include one or more flash memory cells, or may be any secondary or tertiary storage device, such as magnetic media, optical media, tape, or soft or hard disk.

Further, computer platform 54 also includes a processing engine 56, which may be an application-specific integrated circuit ("ASIC"), or other chipset, processor, logic circuit, or other data processing device.

The data registry 58 of computer platform 54 includes user/child storage files 60 that includes the media files 18 communicated from network device 12 and stored at wireless device 14 for the subsequent retrieval by the media requesting wireless device 10. In many aspects, the data registry 58 may include an individual user/child storage file 60 for each wireless device 10 that is associated with temporary storage device 14 for the purpose of using wireless device 14 for the temporary storage of media content files 18.

The memory 58 of second wireless communication device 14 may also include a peer-to-peer wireless communication module 38 that is operable to provide direct communication between the first wireless communication device 10 and the temporary storage wireless communication device 14. In one aspect, the media file that is temporarily stored may be communicated from the temporary storage wireless device 14 to wireless device 10 by peer-to-peer communication. In one aspect, the peer-to-peer communication module 38 or any other wireless communication module, such as communications module 40, may continually attempt, at predefined intervals, to deliver/download the temporarily media file(s) to the requesting wireless device 10. In such aspects, delivery/download may successfully occur when the first wireless device 10 is sufficient in terms of the delivery attribute at issue. For example, delivery may occur when sufficient memory is available at wireless device 10 or sufficient signal strength exists at wireless device 10. As previously noted, when a media file 18 is communicated from the temporary storage device 14 to the first wireless device 10, the media file may be removed from the data registry 58 of second wireless device 14 or the media files may remain in data registry 58 for an indefinite or predetermined period of time for the purpose of providing back-up storage for the first wireless device 10.

In alternate aspects, the peer-to-peer wireless communication module 38 may be configured to receive a temporary storage retrieval request 72 communicated from wireless device 10. Temporary storage retrieval request 72 is typically generated by wireless device 10 in response to a determination that the delivery attribute that previously prohibited delivery/download is currently sufficient to provide for delivery/download of the media content file(s). For example, the available memory at wireless device 10 may be sufficient to allow for the storage of the temporarily stored media content files or the current signal strength may be sufficient to provide for reliable delivery/download of the media content files 18.

In other aspects, the peer-to-peer communication module may generate and communicate a temporary storage retrieval request 72 that may either continually generated and sent to request the deliver/download of the temporarily stored media file regardless of assessment of delivery attributes or the request 72 may be generated and sent upon determination that the delivery attributes, such as available memory and signal strength, are sufficient to warrant deliver/download.

Figure 5:
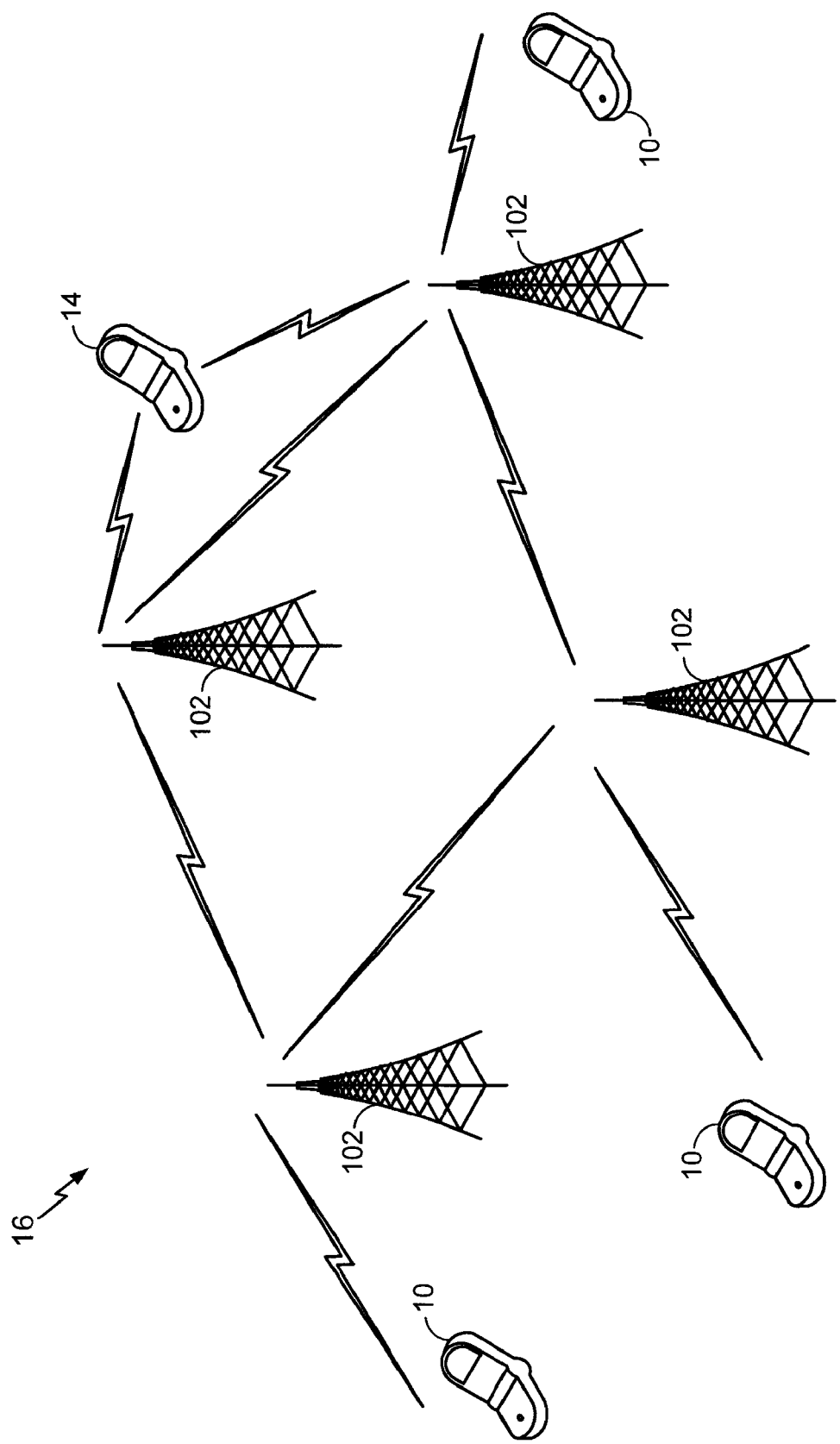
FIG. 5 is a schematic representation of a wireless network communication system as implementing by the wireless communication device of the present aspects.

Referring now to FIG. 5, a wireless network communication system 16 is illustrated in accordance with an aspect. System 16 can include one or more base stations 102 located in one or more cells that receive, transmit, repeat, etc., wireless communication signals to each other and/or to one or more wireless communication devices 10 and wireless device 14. Each base station 102 can include a transmitter chain and a receiver chain (not shown in FIG. 3), each of which can in turn include a plurality of components associated with signal transmission and reception (e.g., processors, modulators, multiplexers, demodulators, demultiplexers, antennas, etc.), as will be appreciated by one skilled in the art. Wireless communication devices 10 can be, for example, cellular phones, smart phones, laptops, handheld communication devices, handheld computing devices, satellite radios, global positioning systems, PDAs, and/or any other suitable device for communicating over wireless network 16. System 16 can be employed in conjunction with various aspects described herein in order to facilitate adaptation of the wireless communication devices based on environmental and/or behavior conditions and/or patterns.

Figure 6:
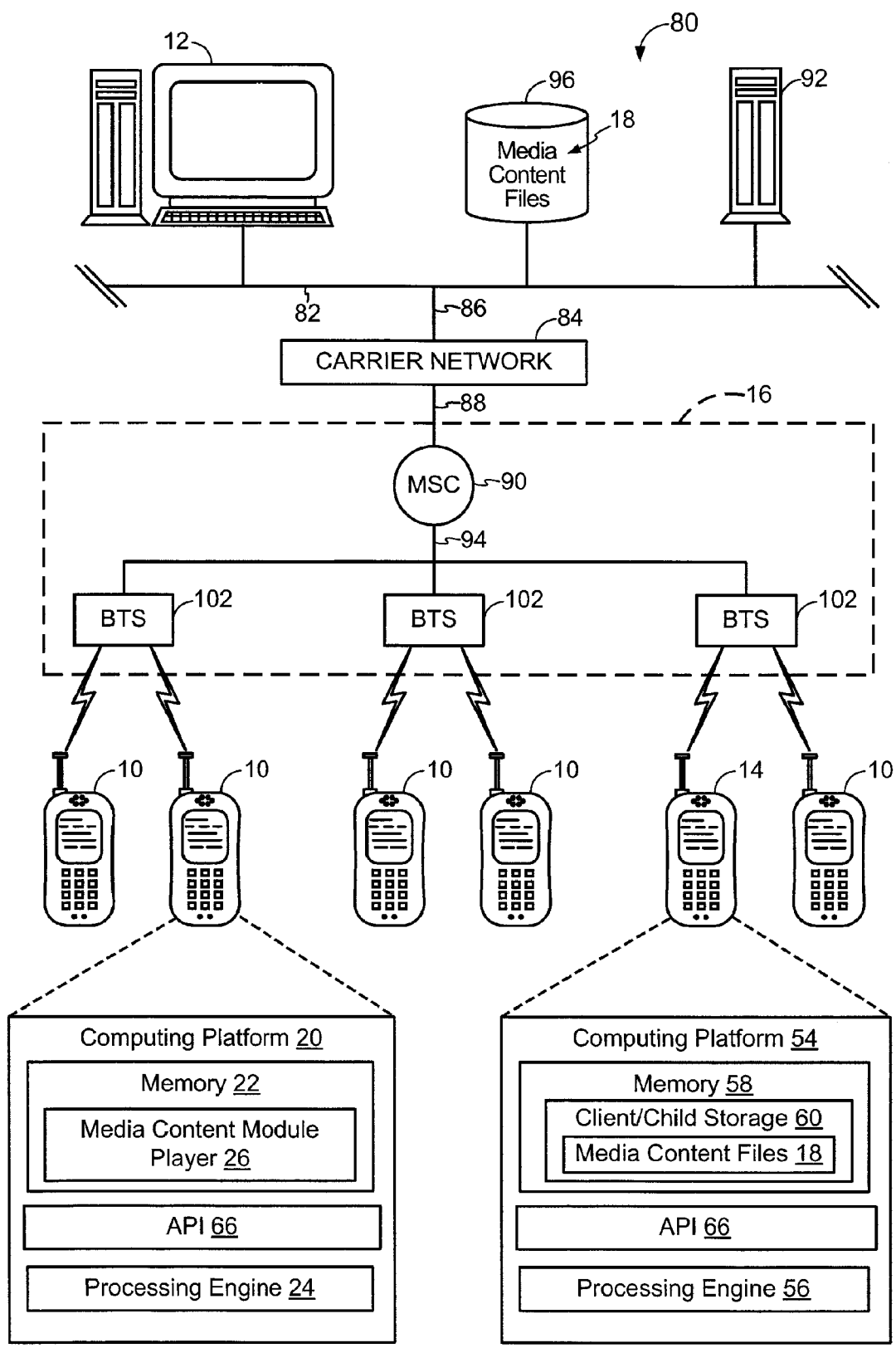
FIG. 6 is a schematic diagram of one aspect of a cellular telephone network for implementing temporary media content storage at the cellular telephone device level.

Referring to FIG. 6, in one aspect, mobile devices 10 and 14 comprise a wireless communication device, such as a cellular telephone. A cellular telephone system 80 may include wireless network 16 connected to a wired network 82 via a carrier network 84. Wireless communication devices 10 and 14 are being manufactured with increased computing capabilities and often can communicate packets including voice and data over wireless network 16. As described earlier, these "smart" wireless devices 10 and 14 may have APIs 66 resident on their local computer platform 18 that allow software developers to create software applications that operate on the wireless communication device 10 and 14, and control certain functionality on the device. FIG. 5 is a representative diagram that more fully illustrates the components of a wireless communication network and the interrelation of the elements of one aspect of the present system. Cellular telephone system 80 is merely exemplary and can include any system whereby remote modules, such as wireless communication devices 10, 14 communicate over-the-air between and among each other and/or between and among components of a wireless network 16, including, without limitation, wireless network carriers and/or servers.

In system 80, network device 12 can be in communication over a wired network 82 (e.g. a local area network, LAN) with a separate network database 96 for storing the media content files 18. Further, a data management server 92 may be in communication with network device 12 to provide post-processing capabilities, data flow control, etc. Network device 12, network database 96 and data management server 92 may be present on the cellular telephone system 80 with any other network components that are needed to provide cellular telecommunication services. Network device 12, and/or data management server 92 communicate with carrier network 84 through a data links 86 and 88, which may be data links such as the Internet, a secure LAN, WAN, or other network. Carrier network 84 controls messages (generally being data packets) sent to a mobile switching center ("MSC") 90. Further, carrier network 84 communicates with MSC 90 by a network 88, such as the Internet, and/or POTS ("plain old telephone service"). Typically, in network 88, a network or Internet portion transfers data, and the POTS portion transfers voice information. MSC 90 may be connected to multiple base stations ("BTS") 100 by another network 94, such as a data network and/or Internet portion for data transfer and a POTS portion for voice information. BTS 100 ultimately broadcasts messages wirelessly to the wireless communication devices 10 and 14, by short messaging service ("SMS"), or other over-the-air methods.

Figure 7:
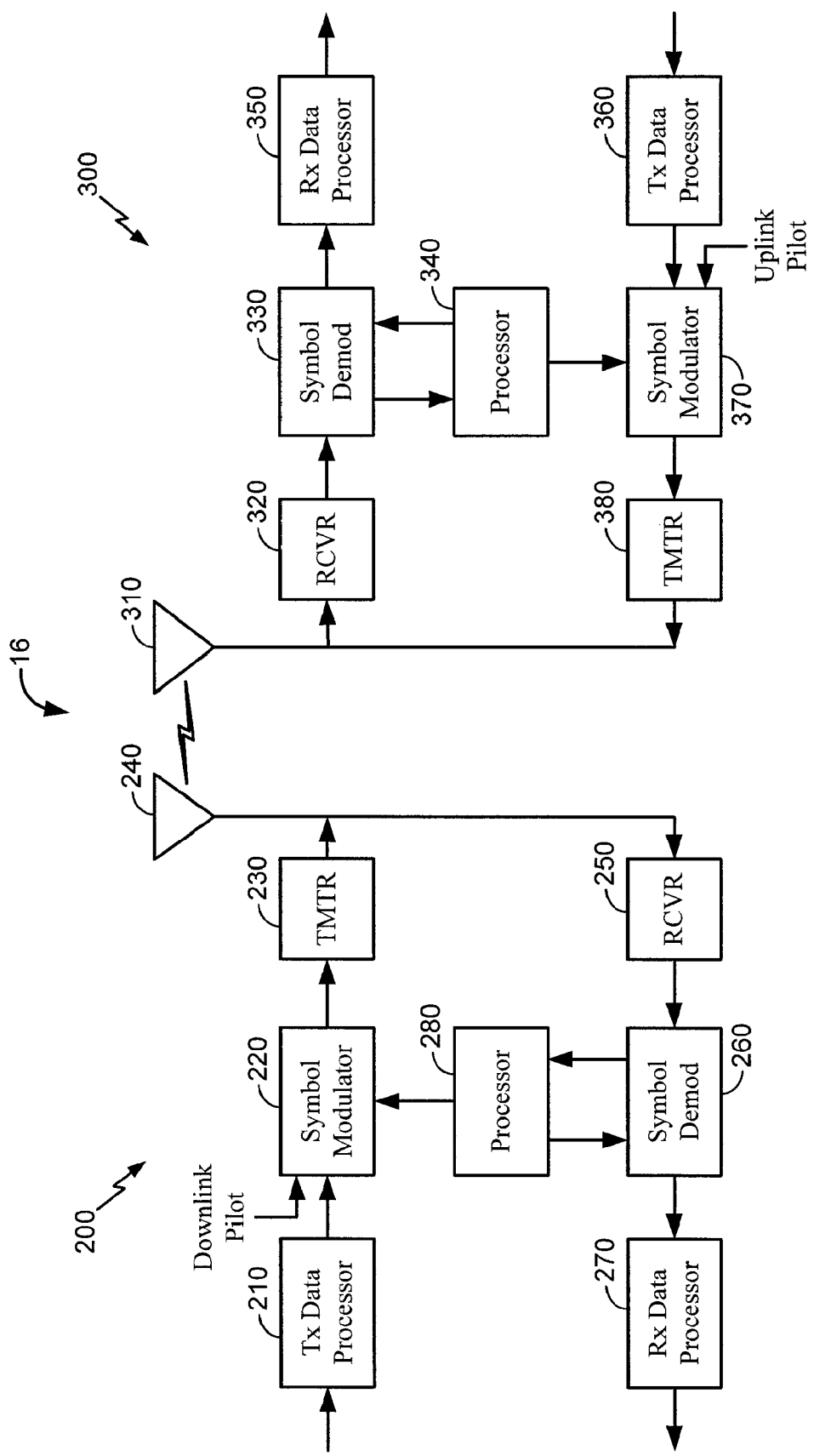
FIG. 7 is a block diagram representation of wireless communication between the wireless communication devices of the present aspects.

FIG. 7 is block diagram illustration of a wireless network 16 environment that can be employed in accordance with an aspect. The wireless network shown in FIG. 4 may be implemented in an FDMA environment, an OFDMA environment, a CDMA environment, a WCDMA environment, a TDMA environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The wireless network 16 includes an access point 200 and a wireless communication device 300. Access point 200 includes a transmit (TX) data processor 210 that receives, formats, codes, interleaves, and modulates (or symbol maps) traffic data and provides modulation symbols ("data symbols"). The TX data processor 210 is in communication with symbol modulator 220 that receives and processes the data symbols and pilot symbols and provides a stream of symbols. Symbol modulator 220 is in communication with transmitter unit (TMTR) 230, such that symbol modulator 220 multiplexes data and pilot symbols and provides them to transmitter unit (TMTR) 230. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 230 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through antenna 240 to the terminals.

At wireless communication device 300, antenna 310 receives the downlink signal and provides a received signal to receiver unit (RCVR) 320. Receiver unit 320 conditions (e.g., filters, amplifies, and frequency downconverts) the received signal and digitizes the conditioned signal to obtain samples. Receiver unit 320 is in communication with symbol demodulator 330 that demodulates the conditioned received signal. Symbol demodulator 330 is in communication with processor 340 that receives pilot symbols from symbol demodulator 330 and performs channel estimation on the pilot symbols. Symbol demodulator 330 further receives a frequency response estimate for the downlink from processor 340 and performs data demodulation on the received data symbols to obtain data symbol estimates (which are estimates of the transmitted data symbols). The symbol demodulator 330 is also in communication with RX data processor 350, which receives data symbol estimates from the symbol demodulator and demodulates (i.e., symbol demaps), deinterleaves, and decodes the data symbol estimates to recover the transmitted traffic data. The processing by symbol demodulator 330 and RX data processor 350 is complementary to the processing by symbol modulator 220 and TX data processor 210, respectively, at access point 200.

On the uplink, a TX data processor 360 processes traffic data and provides data symbols. The TX data processor is in communication with symbol modulator 370 that receives and multiplexes the data symbols with pilot symbols, performs modulation, and provides a stream of symbols. The symbol modulator 370 is in communication with transmitter unit 380, which receives and processes the stream of symbols to generate an uplink signal, which is transmitted by the antenna 310 to the access point 200.

At access point 200, the uplink signal from wireless communication device 200 is received by the antenna 240 and processed by a receiver unit 250 to obtain samples. The receiver unit 250 is in communication with symbol demodulator 260 then processes the samples and provides received pilot symbols and data symbol estimates for the uplink. The symbol demodulator 260 is in communication with RX data processor 270 that processes the data symbol estimates to recover the traffic data transmitted by wireless communication device 200. The symbol demodulator is also in communication with processor 280 that performs channel estimation for each active terminal transmitting on the uplink. Multiple terminals may transmit pilot concurrently on the uplink on their respective assigned sets of pilot subbands, where the pilot subband sets may be interlaced.

Processors 280 and 340 direct (e.g., control, coordinate, manage, etc.) operation at access point 200 and wireless communication device 300, respectively. Respective processors 280 and 340 can be associated with memory units (not shown) that store program codes and data. Processors 280 and 340 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 280 and 340.

Figure 8:
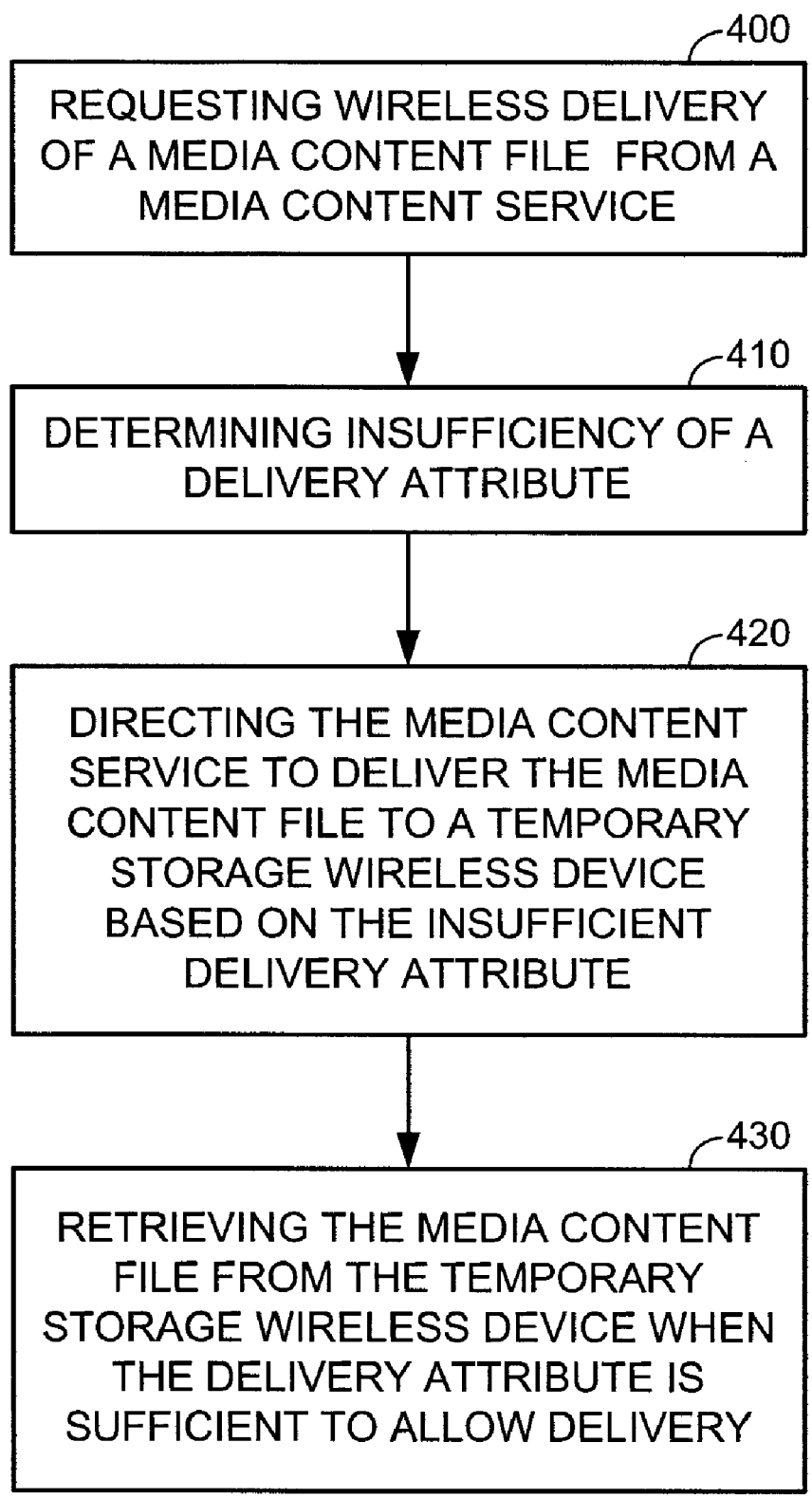
FIG. 8 is a flow diagram of a method for requesting a media content file and directing delivery of the file to a temporary storage wireless communication device, according to one aspect.

FIG. 8 details a flow diagram of a method for requesting media file content at a first wireless communication device and directing delivery of the content to a second wireless communication device for the purpose of temporarily storing the content. At Event 400, the first wireless communication requests wireless delivery of a media content file from a media content service. The media content file may comprise a song file, another audio file, a video file, a multimedia file or the like. In one specific aspect, requesting wireless delivery of a media content file may entail launching an Internet browser application, creating an uplink connection via http to a media service content provider site and sending a request for a media content file to the service.

At Event 410, the first wireless device determines insufficiency of a delivery/download attribute that prohibits the current delivery/download of the media content to the first wireless communication device. Determining insufficiency of a delivery attribute may be accomplished by various processes. In one aspect, the network service provider may attempt to deliver/download the media file to the first wireless communication device but is prevented due to insufficiency of a delivery attribute. For example, the delivery may be prevented because the available memory at the first wireless device is less than the storage size of the requested media file. In another example, the delivery may be prevented because the signal strength at the first wireless communication device is insufficient to support the download of the media file onto the device. In other aspects, the first wireless device may determine the insufficiency of the delivery attribute prior to the media content service attempting to deliver/download the media file to the first wireless communication device. In such aspects, the first wireless communication device may monitor the delivery attribute, such as available memory and/or wireless network signal strength and determine sufficiency/insufficiency of the delivery attribute based on a comparison of the available memory to the storage size of the media file or a comparison of the current signal strength to a signal strength delivery threshold. In this instance, the first wireless communication device may determine insufficiency of the delivery attribute and notify the media content service of the inability to support proper delivery/download or, alternatively, the first wireless device may communicate the monitored delivery attribute information to the content provider, which may undertake the one or more comparisons to determine the insufficiency/sufficiency of the delivery attribute.

At Event 420, the first wireless communication device directs the media content service to deliver the media content file to a temporary storage wireless communication device based on the insufficiency of the delivery attribute. Directing the media content service to deliver the media content file to a temporary storage device may include identifying a temporary storage wireless device. Identification of the temporary storage device may occur via inclusion if a device identifier, such as an IP address or the like, in the media content request or in a separate correspondence, such as an alternate delivery destination request or the like. Directing the media content to deliver the media content file to a temporary storage device may occur via the error messages sent from the first wireless device to the media content service or the direction may occur via a specific correspondence, such as a media content request, an alternate delivery destination request or the like.

At Event 430, the first wireless communication device retrieves the media content from the temporary storage device when the delivery attribute is sufficient to allow delivery. In one aspect, retrieval of the media content from temporary storage device may occur by continually prompting, at a predefined interval, the temporary storage device to deliver/download the media files. In this aspect, the delivery/downloading of the media file will occur when the delivery attributes are sufficient, i.e., the signal strength provides for download capability or the available memory exceeds the storage size of the media file. In other aspects, the first communication device may monitor the delivery attributes and the first communication device may prompt the temporary storage device for delivery/download when the monitored delivery attributes are determined to be sufficient to support deliver/download.

Figure 9:
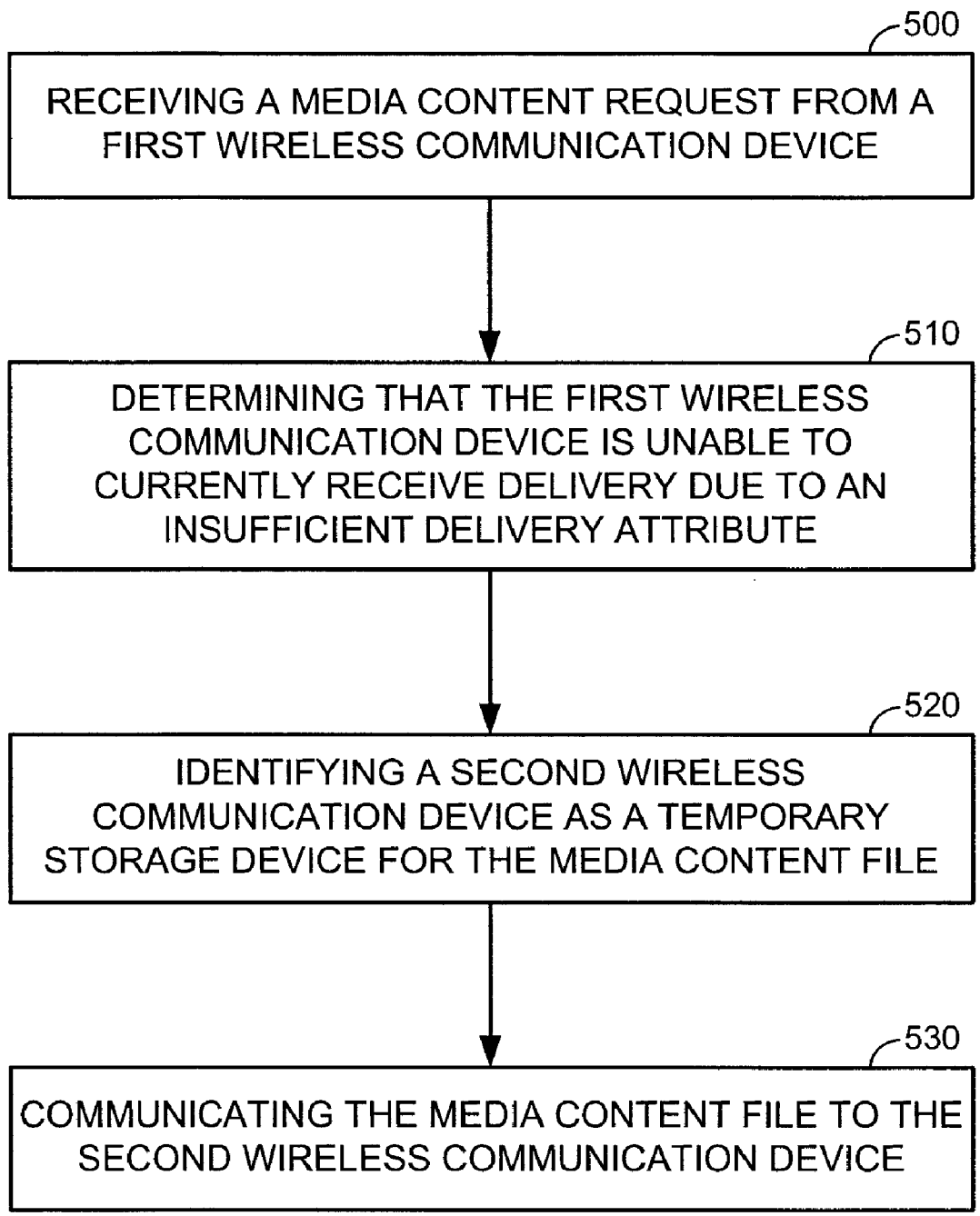
FIG. 9 is a flow diagram of a method for temporarily storing a media content file at a wireless communication device and automatically forwarding the file to the requested wireless device, according to one aspect.

Referring to FIG. 9, a flow diagram is depicted of a method for directing delivery/download of a requested media file to a temporary storage wireless device, according to one aspect. At Event 500, a media content provider receives a wireless request for a media content file from a first wireless device. The media content file may comprise a song file, another audio file, a video file, a multimedia file or the like. In one specific aspect, the media content request may be received over a wireless Internet connection. At Event 510, the media content provider determines that the first communication device is unable to currently receive delivery of the media file due to an insufficient delivery attribute. In some aspects, the determination may occur by the media content provider attempting to deliver/download the media content file and receiving, in response to unsuccessful attempts at delivering/downloading to media content file, error messages. In alternate, aspects the determination may occur by receiving a communication from the first wireless communication device, such as alternate delivery destination request, that indicates that one or more delivery attributes are currently preventing delivery of the media content files. In another alternate aspect, the determination may occur at the media content provider based on delivery attribute information communicated from the first wireless delivery device. For example, the first wireless communication device may communicate the current available memory or the current wireless network signal strength and the media content provider may compare these to the storage size of the media file or the signal strength delivery threshold to determine if the first wireless communication device is unable to be currently receive delivery.

At Event 520, the media content provider identifies a second wireless communication device as a temporary storage device for the media content file. The second wireless communication device may be identified by a device identifier included within the media content request, an alternate delivery destination request, any other correspondence from the first wireless communication device or included within a user profile accessible to the media content provider. At Event 530, the media content provider will communicate the requested media content files to the second wireless communication device that has been identified as the temporary storage wireless device.

Figure 10:
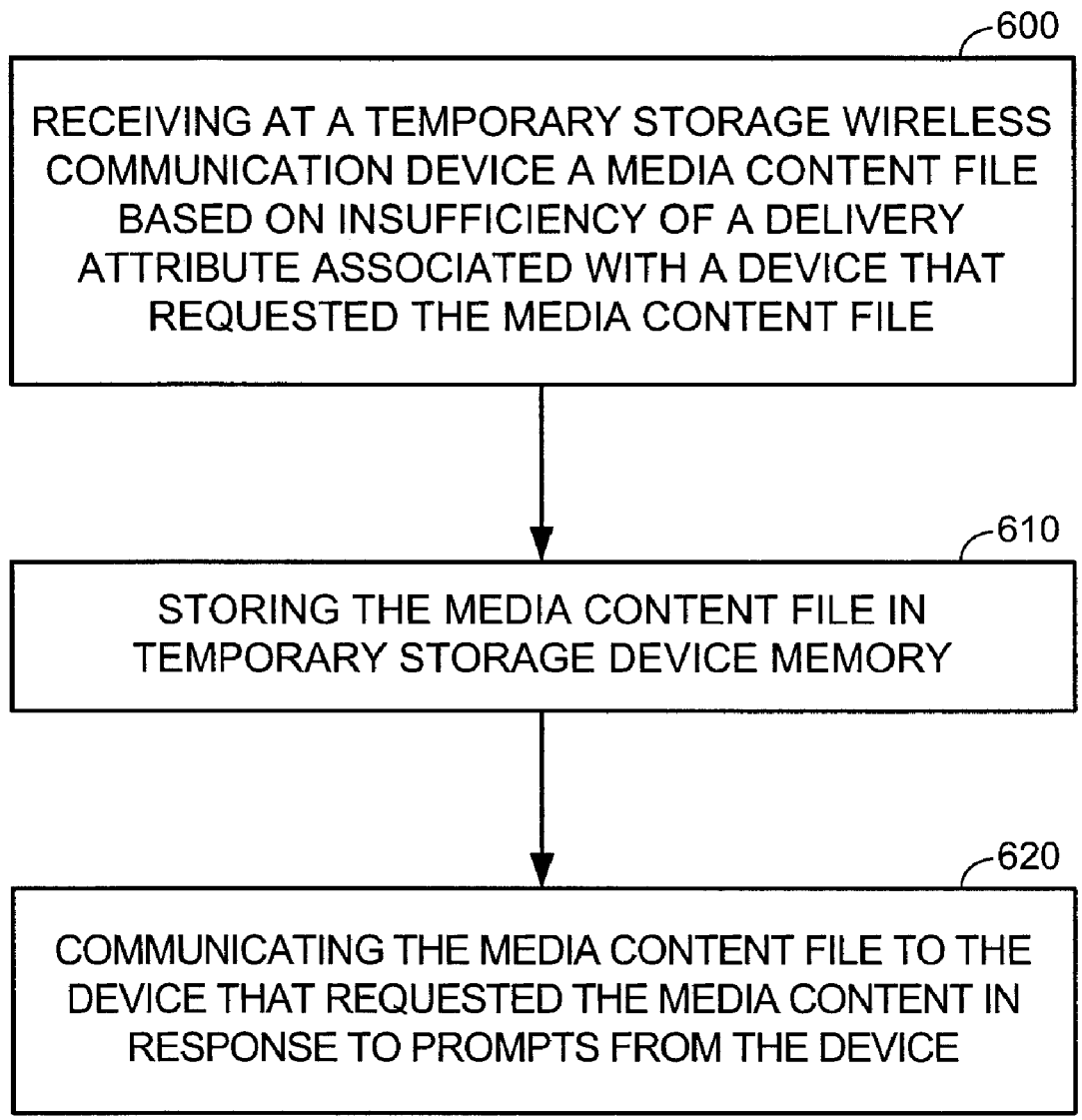
FIG. 10 is a flow diagram of a method for receiving a media content file request at a media content service and directing delivery of the file to temporary storage wireless communication device, according to one aspect.

Referring to FIG. 10, a flow diagram is depicted of a method for receiving and storing media files temporarily on a wireless device, according to one aspect. At Event 600, a wireless device that has been designated as a temporary storage device receives a media content file from a media content provider. Delivery to the temporary storage wireless device is based on the insufficiency of a delivery attribute associated with a wireless device that requested the media files. For example, the requesting wireless device may have insufficient memory to allow for storage of the media files or the strength of the wireless network signal is insufficient to allow for downloading/delivery. The temporary storage device may be designated as such by an association with the requesting wireless device. For example, the temporary storage device may be used by a family member, a co-worker, a group or organization member or the like.

At Event 610, the temporary storage wireless device stores the media files in device memory. The files may be cached in temporary storage in instances in which they prone to immediate transfer to the requesting wireless device or the files may be stored in permanent memory for longer term storage periods. As noted previously, once the files have been communicated to the requesting wireless device, the files may be deleted from memory on the temporary storage device or the files may be stored indefinitely or for a predetermined period of time.

At Event 620, the media files are communicated to the requesting wireless device. In some aspects, the requesting wireless device may continuously prompt, at predefined intervals, the temporary storage wireless device to attempt delivery/download of the media files. In other aspects, the temporary device will continuously, at predefined intervals, attempt to deliver/download the media files to the requesting device. The delivery/download attempts will continue until the delivery/download is successful at the requesting wireless device. In other aspects, the requesting device may monitor the delivery attributes and may prompt the temporary storage device for delivery/download when the delivery attributes are determined to be sufficient to provide for delivery/download.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine-readable medium and/or computer readable medium.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Thus, the described aspects provide for methods, devices, computer program products, processors and systems that provide for temporary storage of media content on a wireless communication device. According to aspects, when a wireless communication device requests media content from a media content service but is unable to receive the media due to insufficient memory availability, insufficient wireless network signal strength or another delivery attribute, the media content service directs delivery of the content to the associated temporary storage wireless communication device. In turn, the wireless device that requested the media content is able to automatically retrieve the media content from the temporary storage device when memory capacity or network signal strength is deemed sufficient to provide for storage or reception. The present aspects provide for mobile storage and allow for handset-to-handset delivery of the media content files, which is beneficial in overcoming inherent problems related to signal strength at the fringes of network coverage or when the requesting device has difficulty maintaining a download connection.

Many modifications and other aspects will come to mind to one skilled in the art to which this invention pertains having the benefit of the teachings presented in the foregoing descriptions and the associated drawings. Therefore, it is to be understood that the aspect is not to be limited to the specific aspects disclosed and that modifications and other aspects are intended to be included within the scope of the appended claims. Although specific terms are employed herein, they are used in a generic and descriptive sense only and not for purposes of limitation. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for temporary storage of a media content file on a wireless communication device, comprising:
    requesting, at a first wireless communication device, wireless communication of a media content file from a media content service;
    directing the media content service to communicate the media content file to a second wireless communication device for temporary storage and subsequent retrieval by the first wireless communication device based on current insufficiency of at least one delivery attribute;
    monitoring, at the first wireless communication device, the status of the at least one delivery attribute;
    determining that the at least one delivery attribute has become sufficient; and
    requesting, directly from the first wireless communication device to the second wireless communication device over a peer-to-peer wireless network independent of a wireless network associated with the media content service, the second wireless communication device to communicate the media content file to the first wireless communication device based on the determination that the at least one delivery attribute at the first wireless communication device has become sufficient.

2. The method of claim 1, wherein the at least one delivery attribute is further defined as available memory amount at the first wireless communication device.

3. The method of claim 2, further comprising determining that media content file size exceeds the available memory amount at the first wireless communication device.

4. The method of claim 2, further comprising:
    monitoring, at the first wireless communication device, the available memory amount; and
    requesting the second wireless communication device to communicate the media content file to the first wireless communication device when the available first wireless communication device memory equals or exceeds media content file size.

5. The method of claim 1, further comprising receiving, at the first wireless communication device, the media content file from the second wireless communication device based on the requesting of the second wireless communication device.

6. The method of claim 5, wherein receiving, at the first wireless communication device, the media content file from the second wireless communication device further comprises receiving, via peer-to-peer wireless communication, the media content file from the second wireless communication device.

7. The method of claim 5, further comprising storing the media content file on the first wireless communication device.

8. The method of claim 2, further comprising requesting, continually, the second wireless communication device to communicate the media file to the first wireless communication device.

9. The method of claim 8, wherein requesting, continually, the second wireless communication device to communicate the media file to the first wireless communication device further comprises requesting, continually, via peer-to-peer wireless communication, the second wireless communication device to communicate the media file to the first wireless communication device.

10. The method of claim 8, further comprising receiving, at the first wireless communication device, the media content file from the second wireless communication device when the available memory amount is equal to or exceeds media content file size.

11. The method of claim 10, wherein receiving, at the first wireless communication device, the media content file from the second wireless communication device further comprises receiving, at the first wireless communication device, via peer-to-peer wireless communication, the media content file from the second wireless communication device.

12. The method of claim 1, wherein the at least one delivery attribute is further defined as wireless network signal strength.

13. The method of claim 12, further comprising determining that wireless network signal strength is insufficient to provide for wireless communication of media content file from the media content service to the first wireless communication device.

14. The method of claim 12, further comprising:
    monitoring, at the first wireless communication device, the received signal strength power; and
    requesting the second wireless communication device to communicate the media content file to the first wireless communication device when received signal strength power exceeds a predetermined threshold to provide for wireless delivery of the media content file from the second wireless communication device to the first wireless communication device.

15. The method of claim 14, further comprising receiving, at the first wireless communication device, the media content file from the second wireless communication device based on the requesting of the second wireless communication device.

16. The method of claim 15, wherein receiving, at the first wireless communication device, the media content file from the second wireless communication device further comprises receiving, via peer-to-peer communication, at the first wireless communication device, the media content file from the second wireless communication device.

17. The method of claim 15, further comprising storing the media content file on the first wireless communication device.

18. The method of claim 12, further comprising requesting, continually, the second wireless communication device to communicate the media content file to the wireless communication device.

19. The method of claim 18, wherein requesting, continually, the second wireless communication device to communicate the media content file further comprises requesting, continually, via peer-to-peer wireless communication, the second wireless communication device to communicate the media content file.

20. The method of claim 18, further comprising receiving, at the first wireless communication device, the media content file from the second wireless communication device when the wireless network signal strength is sufficient to provide for wireless delivery of the media content file from the second wireless communication device to the first wireless communication device.

21. The method of claim 20, wherein receiving, at the first wireless communication device, the media content file from the second wireless communication device further comprises receiving, at the first wireless communication device, via peer-to-peer wireless communication, the media content file from the second wireless communication device.

22. The method of claim 1, wherein directing the media content service to communicate the media content file to a second wireless communication device further comprises identifying the second wireless communication device in the request for wireless communication of the media content file.

23. The method of claim 1, wherein directing the media content service to communicate the media content file to a second wireless communication device further comprises providing the media content service with second wireless communication device identification that is stored in a first wireless communication device user file.

24. At least one processor configured to perform the actions of:
requesting, at a first wireless communication device, wireless communication of a media content file from a media content service;
directing the media content service to communicate the media content file to a second wireless communication device for temporary storage and subsequent retrieval by the first wireless communication device based on current insufficiency of at least one delivery attribute;
monitoring, at the first wireless communication device, the status of the at least one delivery attribute;
determining that the at least one delivery attribute has become sufficient; and
requesting, directly from the first wireless communication device to the second wireless communication device over a peer-to-peer wireless network independent of a wireless network associated with the media content service, the second wireless communication device to communicate the media content file to the first wireless communication device based on the determination that the at least one delivery attribute at the first wireless communication device has become sufficient.

25. A non-transitory computer-readable medium comprising:
a first set of codes for causing a computer at a first wireless communication device to request a wireless communication of a media content file from a media content service;
a second set of codes for causing the computer to direct the media content service to communicate the media content file to a second wireless communication device for temporary storage and subsequent retrieval by the first wireless communication device based on current insufficiency of at least one delivery attribute;
a third set of codes for causing the computer to monitor, at the first wireless communication device, the status of the at least one delivery attribute;
a fourth set of codes for causing the computer to determine that the at least one delivery attribute has become sufficient; and
a fifth set of codes for causing the computer to request, directly from the first wireless communication device to the second wireless communication device over a peer-to-peer wireless network independent of a wireless network associated with the media content service, the second wireless communication device to communicate the media content file to the first wireless communication device based on the determination that the at least one delivery attribute at the first wireless communication device has become sufficient.

26. A first wireless communication device, comprising:
a computer platform including a processor and a memory;
a media content module stored in the memory and executable by the processor, wherein the media content module is operable to generate and wirelessly transmit a service content request to a media content service, the service content request operable to request delivery of a predetermined media content file, direct the media content service to communicate the media content file to a second wireless communication device based on current insufficiency of at least one delivery attribute and retrieve the media content file from the second wireless communication device based on subsequent sufficiency of the at least one delivery attribute, wherein the media content module is further operable to assess the at least one delivery attribute and to determine when the at least one delivery attribute has become sufficient; and
a communications module operable to request, directly from the first wireless communication device to the second wireless communication device over a peer-to-peer wireless network independent of a wireless network associated with the media content service, the second wireless communication device to communicate the media content file to the first wireless communication device based on the determination that the at least one delivery attribute at the first wireless communication device has become sufficient.

27. The first wireless communication device of claim 26, wherein the at least one delivery attribute is chosen from the group consisting of available memory amount and wireless network signal strength.

28. The first wireless communication device of claim 27, wherein the at least one delivery attribute is defined as available memory amount at the first wireless communication device and wherein the media content module is operable to determine if the available memory amount is less than the predetermined media content file size.

29. The first wireless communication device of claim 27, wherein the at least one delivery attribute is defined as wireless network strength and wherein the media content module is operable to determine if the wireless network signal strength meets a predetermined delivery threshold signal strength.

30. The first wireless communication device of claim 26, wherein the service content request further comprises at least one current delivery attribute associated with the first wireless communication device.

31. The first wireless communication device of claim 26, wherein the service content request further comprises an alternate delivery destination comprising a second wireless communication device identifier, wherein the alternate delivery destination is operable to direct delivery of the predetermined media content file to a second wireless communication device corresponding to the second wireless communication device identifier based on insufficiency of at least one delivery attribute.

32. The first wireless communication device of claim 26, wherein the media content module is further operable to generate and wirelessly transmit an alternate delivery destination request to the media content service, wherein the alternate delivery destination request comprises a second wireless communication device identifier, and wherein the alternate delivery destination request is operable to direct delivery of the predetermined media content file to a second wireless communication device corresponding to the second wireless communication device identifier based on insufficiency of at least one delivery attribute.

33. The first wireless communication device of claim 26, wherein the media content module is further operable for monitoring the at least one delivery attribute after the media content service has been directed to communicate the media content file to a second wireless communication device.

34. The first wireless communication device of claim 26, further comprising a peer-to-peer communication module operable to retrieve the media content file from the second wireless communication device.

35. The first wireless communication device of claim 34, wherein the peer-to-peer communication module is operable to request the second wireless communication device to communicate the media content file to the first wireless communication device when the previous insufficient delivery attributed is determined to be sufficient.

36. The first wireless communication device of claim 34, wherein the peer-to-peer communication module is operable to request, continually, the second wireless communication device to communicate the media file to the first wireless communication device once the second wireless communication device has received the media content file.

37. A first wireless communication device, comprising:
means for requesting, at the first wireless communication device, wireless communication of a media content file from a media content service;
means for directing the media content service to communicate the media content file to a second wireless communication device for temporary storage and subsequent retrieval by the first wireless communication device based on current insufficiency of at least one delivery attribute;
means for monitoring, at the first wireless communication device, the status of the at least one delivery attribute;
means for determining that the at least one delivery attribute has become sufficient; and
means for requesting, directly from the first wireless communication device to the second wireless communication device over a peer-to-peer wireless network independent of a wireless network associated with the media content service, the second wireless communication device to communicate the media content file to the first wireless communication device based on the determination that the at least one delivery attribute at the first wireless communication device has become sufficient.

38. A method for temporary storage of a media content file, the method comprising:
receiving, at a first wireless communication device, a media content file, delivered from a media content service, wherein receipt of the media content file by the first wireless communication device is based on an insufficient delivery attribute associated with a media content request generated by a second wireless communication device, wherein the first wireless communication device is associated with the second wireless communication device;
storing the media content file at the first wireless communication device;
receiving, at the first wireless communication device, a prompt directly from the second wireless communication device over a peer-to-peer wireless network independent of a wireless network associated with the media content service to communicate the media content file; and
communicating the media content file from the first wireless communication device to the second wireless communication device independently from the media content service in response to the prompt from the second wireless communication device.

39. The method of claim 38 wherein the delivery attribute is chosen from the group consisting of available memory amount at the second wireless communication device and wireless network signal strength at the second wireless communication device.

40. The method of claim 38, wherein communicating the media content file to the second wireless communication device further comprises communicating the media content file to the second wireless communication device, repeatedly, in response to continuous prompts from the second wireless device until the communication is successfully received at the second wireless communication device.

41. The method of claim 38, wherein communicating the media content file to the second wireless communication device further comprises communicating the media content file to the second wireless communication in response to a prompt from the second wireless device, wherein the prompt is based on sufficiency of one or more delivery attributes at the second wireless communication device.

42. The method of claim 41, wherein the prompt is based on sufficiency of one or more delivery attributes at the second wireless communication device further and defines sufficiency of one more delivery attributes at the second wireless communication device as at least one of sufficient available memory amount and sufficient wireless network signal strength.

43. The method of claim 38, wherein communicating the media content file to the second wireless communication device further comprises communicating the media content file to the second wireless communication device via peer-to-peer wireless communication.

44. The method of claim 38, further comprising communicating a storage size of the media content file to the second wireless communication device prior to communicating the media content file to the second wireless communication device.

45. The method of claim 38, further comprising identifying the first wireless communication device as a temporary storage device for the second wireless communication device based on a first wireless communication device identifier stored in a second wireless device profile at the media content service.

46. The method of claim 38, further comprising identifying the first wireless communication device as a temporary storage device for the second wireless communication device based on a first wireless communication device identifier included within the media content request sent from the second wireless communication device to the media content service.

47. At least one processor configured to perform the actions of:
receiving, at a first wireless communication device, a media content file, delivered from a media content service, wherein receipt of the media content file by the first wireless communication device is based on an insufficient delivery attribute associated with a media content request generated by a second wireless communication device, wherein the first wireless communication device is associated with the second wireless communication device;

storing the media content file at the first wireless communication device;

receiving, at the first wireless communication device, a prompt directly from the second wireless communication device over a peer-to-peer wireless network independent of a wireless network associated with the media content service to communicate the media content file; and communicating the media content file from the first wireless communication device to the second wireless communication device independently from the media content service in response to the prompt from the second wireless communication device.

48. A non-transitory computer-readable medium comprising:

a first set of codes for causing a computer at a first wireless communication device to receive a media content file delivered from a media content service, wherein receipt of the media content file by the first wireless communication device is based on an insufficient delivery attribute associated with a media content request generated by a second wireless communication device, wherein the first wireless communication device is associated with the second wireless communication device;

a second set of codes for causing the computer to store the media content file at the first wireless communication device;

a third set of codes for causing a computer to receive, at the first wireless communication device, a prompt directly from the second wireless communication device over a peer-to-peer wireless network independent of a wireless network associated with the media content service to communicate the media content file; and a fourth set of codes for causing the computer to communicate the media content file from the first wireless communication device to the second wireless communication device independently from the media content service in response to prompt from the second wireless communication device.

49. A first wireless communication device, comprising:

a computer platform including a processor and a memory, wherein the memory is operable to store a media content file, which has been delivered from a media content service based on an insufficient delivery attribute associated with a media content request generated by a second wireless communication device, wherein the first wireless communication device is associated with the second wireless communication device; and a communications module executable by the processor and operable to receive, at the first wireless communication device, a prompt directly from the second wireless communication device over a peer-to-peer wireless network independent of a wireless network associated with the media content service to communicate the media content and further operable to communicate the media content file from the first wireless communication device to the second wireless communication device in response to the prompt from the second wireless communication device.

50. The first wireless communication device of claim 49, wherein the delivery attribute is chosen from the group consisting of available memory amount at the second wireless communication device and wireless network signal strength at the second wireless communication device.

51. The first wireless communication device of claim 49, wherein the communication module is further operable to communicate the media content file to the second wireless communication device, repeatedly, in response to continuous prompts from the second wireless communication device until the communication is successfully received at the second wireless communication device.

52. The first wireless communication device of claim 49, wherein the communication module is further operable to communicate the media content file to the second wireless communication device in response to a prompt from the second wireless communication device, wherein the prompt is based on sufficiency of one or more delivery attributes at the second wireless communication device.

53. The first wireless communication device of claim 52, wherein sufficiency of one or more delivery attributes is further defined as at least one of sufficient available memory amount and sufficient wireless network signal strength.

54. The first wireless communications device of claim 49, wherein the communications module is further defined as a peer-to-peer wireless communications module.

55. The first wireless communications device of claim 49, wherein the communications module is further operable to communicate a storage size of the media content file to the second wireless communication device prior to communicating the media content file to the second wireless communication device.

56. A first wireless communication device, comprising:

means for receiving, at the first wireless communication device, a media content file, delivered from a media content service, wherein receipt of the media content file by the first wireless communication device is based on an insufficient delivery attribute associated with media content request generated by a second wireless communication device, wherein the first wireless communication device is associated with the second wireless communication device;

means for storing the media content file at the first wireless communication device;

means for receiving, at the first wireless communication device, a prompt directly from the second wireless communication device over a peer-to-peer wireless network independent of a wireless network associated with the media content service to communicate the media content file; and means for communicating the media content file from the first wireless communication device to the second wireless communication device independently from the media content service in response to the prompt from the second wireless communication device.

57. A method for temporary media content storage, comprising:

receiving, by a network device, a media service request for a media content file from a first wireless communication device;

determining, at the network device, that the first wireless communication device is unable to currently receive delivery due to an insufficient delivery attribute;

identifying a second wireless communication device as a temporary storage device for the first wireless communication device;

communicating the media content file to the second wireless communication device; and configuring the first wireless communication device to request the media content file directly from the second wireless communication device over a peer-to-peer wireless network independent of a wireless network associated with the network device upon the delivery attribute at the first wireless communication device becoming sufficient.

58. The method of claim 57, wherein determining that the first wireless communication device is unable to currently receive delivery due to an insufficient delivery attribute further defines the delivery attribute as chosen from the group consisting of available memory amount at the first wireless communication device and wireless network signal strength at the first wireless communication device.

59. The method of claim 57, wherein determining that the first wireless communication device is unable to currently receive delivery due to an insufficient delivery attribute further comprises acknowledging receipt of one or more error messages received from the first wireless communication device in response to sending the media content file to the first wireless communication device.

60. The method of claim 57, wherein determining that the first wireless communication device is unable to currently receive delivery due to an insufficient delivery attribute further comprises communicating a storage size of the media content file to the first wireless communication device and receiving a delivery redirect message from the first wireless communication device.

61. The method of claim 57, wherein identifying a second wireless communication device as a temporary storage device for the first wireless communication device further comprises identifying in the media service request a second wireless device identifier associated with the second wireless communication device.

62. The method of claim 57, wherein identifying a second wireless communication device as a temporary storage device for the first wireless communication device further comprises accessing a first wireless communication device profile that includes a second wireless device identifier associated with the second wireless communication device.

63. At least one processor configured to perform the actions of:
receiving, at a network device, a media service request for a media content file from a first wireless communication device;
determining, at the network device, that the first wireless communication device is unable to currently receive delivery due to an insufficient delivery attribute;
identifying a second wireless communication device as a temporary storage device for the first wireless communication device;
communicating the media content file to the second wireless communication device; and
configuring the first wireless communication device to request the media content file directly from the second wireless communication device over a peer-to-peer wireless network independent of a wireless network associated with the network device upon the delivery attribute at the first wireless communication device becoming sufficient.

64. A non-transitory computer readable medium, comprising:
a first set of codes for causing a network device to receive a media service request for media content file from a first wireless communication device;
a second set of codes for causing the network device to determine that the first wireless communication device is unable to currently receive delivery due to an insufficient delivery attribute;
a third set of codes for causing the network device to identify a second wireless communication device as a temporary storage device for the first wireless communication device;
a fourth set of codes for causing the network device to communicate the media content file to the second wireless communication device; and
a fifth set of codes for causing the network device to configure the first wireless communication device to request the media content file directly from the second wireless communication device over a peer-to-peer wireless network independent of a wireless network associated with the network device upon the delivery attribute at the first wireless communication device becoming sufficient.

65. A network device, comprising:
a computer platform including a processor and a memory; and
a media content delivery service module stored in the memory and executable by the processor, wherein the media content delivery module is operable to receive a media service request for a media content file from a first wireless communication device, determine that the first wireless communication device is unable to currently receive delivery due to an insufficient delivery attribute, identify a second wireless communication device as a temporary storage device for the first wireless communication device, communicate the media content file to the second wireless communication device, and configure the first wireless communication device to request the media content file directly from the second wireless communication device over a peer-to-peer wireless network independent of a wireless network associated with the network device upon the delivery attribute at the first wireless communication device becoming sufficient.

66. The network device of claim 65, wherein the media content delivery service module that is operable to determine that the first wireless communication device is unable to currently receive delivery due to an insufficient delivery attribute further defines the delivery attribute as chosen from the group consisting of available memory amount at the first wireless communication device and wireless network signal strength at the first wireless communication device.

67. The network device of claim 65, wherein the media content delivery service module is further operable to acknowledge receipt error messages received from the first wireless communication device in response to sending the media content file to the first wireless communication device.

68. The network device of claim 65, wherein the media content delivery service module is further operable to communicate a storage size of the media content file to the first wireless communication device and receive a delivery redirect message from the first wireless communication device.

69. The network device of claim 65, wherein the media content delivery service module is further operable to identify in the media service request a second wireless device identifier associated with the second wireless communication device.

70. The network device of claim 65, wherein media content delivery service module is further operable to access a first wireless communication device profile that includes a second wireless device identifier associated with the second wireless communication device.

71. A network device, comprising:
means for receiving a media service request for media content file from a first wireless communication device;

means for determining that the first wireless communication device is unable to currently receive delivery due to an insufficient delivery attribute;

means for identifying a second wireless communication device as a temporary storage device for the first wireless communication device;

means for communicating the media content file to the second wireless communication device; and means for configuring the first wireless communication device to request the media content file directly from the second wireless communication device over a peer-to-peer wireless network independent of a wireless network associated with the network device upon the delivery attribute at the first wireless communication device becoming sufficient.

* * * * *